United States Patent

Kutkut et al.

[11] Patent Number: 6,150,795
[45] Date of Patent: Nov. 21, 2000

[54] MODULAR BATTERY CHARGE EQUALIZERS AND METHOD OF CONTROL

[75] Inventors: Nasser H. Kutkut; Herman Wiegman, both of Madison; Raymond Marion, Middleton, all of Wis.

[73] Assignee: Power Designers, LLC, Middleton, Wis.

[21] Appl. No.: 09/434,502

[22] Filed: Nov. 5, 1999

[51] Int. Cl.$^7$ ..................................................... H02J 7/00
[52] U.S. Cl. ............................................................. 320/118
[58] Field of Search ................................... 320/118, 130, 320/132

[56] References Cited

U.S. PATENT DOCUMENTS

| | | | |
|---|---|---|---|
| 4,079,303 | 3/1978 | Cox | 320/119 |
| 4,331,911 | 5/1982 | Park | 320/119 |
| 4,479,083 | 10/1984 | Sullivan | 320/123 |
| 4,684,814 | 8/1987 | Radomski | 290/31 |
| 5,003,244 | 3/1991 | Davis, Jr. | 320/119 |
| 5,177,425 | 1/1993 | Goto | 320/130 |
| 5,479,083 | 12/1995 | Brainard | 320/121 |
| 5,504,415 | 4/1996 | Podrazhansky et al. | 320/118 |
| 5,594,320 | 1/1997 | Pacholok et al. | 320/117 |
| 5,656,915 | 8/1997 | Eaves | 320/118 |
| 5,659,237 | 8/1997 | Divan et al. | 320/119 |
| 5,666,040 | 9/1997 | Bourbeau | 320/118 |
| 5,808,444 | 9/1998 | Saeki et al. | 320/118 |
| 5,814,970 | 9/1998 | Schmidt | 320/118 |
| 5,821,729 | 10/1998 | Schmidt et al. | 320/118 |
| 5,869,950 | 2/1999 | Hoffman, Jr. et al. | 320/118 |
| 5,905,361 | 5/1999 | Saeki et al. | 320/118 |

FOREIGN PATENT DOCUMENTS

| | | |
|---|---|---|
| 0348983 | 6/1989 | European Pat. Off. |
| 0432639 | 12/1990 | European Pat. Off. |
| 0432640 | 12/1990 | European Pat. Off. |
| 4422409 | 1/1996 | Germany . |
| 2-261024 | 10/1990 | Japan . |

OTHER PUBLICATIONS

C.C. Chan, et al., "A Microprocessor Based Intelligent Battery Charger for Electric Vehicle Lead Acid Batteries," Electric Vehicle Symposium, EVS–10, pp. 456–466, Hong Kong, 1990.

D. Bjork, "Maintenance of Batteries–New Trends in Batteries and Automatic Battery Charging," INTELEC Conf. Proceedings, 1986, pp. 355–360.

S. Bergvik, et al., "Prolonged Useful Life and Reduced Maintenance of Lead–Acid Batteries by Means of Individual Cell Voltage Regulation," INTELEC Conf. Proceedings, 1984, pp. 63–66.

H. Schmidt, et al., "The Charge Equalizer–A New System to Extend Battery Lifetime in Photovolatic Systems, U.P.S. and Electric Vehicles," INTELEC Conf. Proceedings, 1993, pp. 146–151.

(List continued on next page.)

Primary Examiner—Peter S. Wong
Assistant Examiner—Pia Tibbits
Attorney, Agent, or Firm—Foley & Lardner

[57] ABSTRACT

Battery charge equalization is carried out utilizing modules connectable in staggered relation between pairs of batteries in a series connected string of batteries. Each module is standardized and has the same construction as the other modules. The modules may be constructed to provide uni-directional charge distribution down the string from a more highly charged battery to a lower charged battery and from a more highly charged last battery in the string back to a less highly charged first battery in the string, or may be constructed to provide bi-directional charge redistribution up or down the string of batteries. The charge equalizer modules are forward-based and reduce the charging current as the voltages on the two batteries to which the module is connected equalize. Each battery equalizer module may comprise a transformer having a primary and a secondary with the same number of turns, a controllable switching device connected in series with the primary, and a free-wheeling diode connected in series with the secondary winding.

36 Claims, 18 Drawing Sheets

OTHER PUBLICATIONS

N.H. Kutkut, et al., "Charge Equalization for Series Connected Battery Strings," IEEE Transactions on Industry Applications, vol. 31, No. 3, May/Jun. 1995, pp. 562–568.

N.H. Kutkut, et al., "Design Considerations for Charge Equalization of an Electric Vehicle Battery System," IEEE APEC Conf. Rec., 1995, pp. 96–103.

N.H. Kutkut, "A Modular Non Dissipative Current Diverter for EV Battery Charge Equalization," IEEE APEC '98 Conf., Anaheim, CA, Feb. 1998, pp. 686–690.

N.H. Kutkut, "Non–Dissipative Current Diverter Using a Centralized Multi–Winding Transformer," PESC '97, Jun. 1997, pp. 648–654.

N.H. Kutkut, et al., "Dynamic Equalization Techniques for Series Battery Stacks," INTELEC '96, Boston, 1996, pp. 514–521.

MODULAR BATTERY CHARGE EQUALIZERS AND METHOD OF CONTROL

FIELD OF THE INVENTION

This invention pertains generally to the field of battery charging and particularly to the equalization of the charge on multiple cells or batteries connected in series.

BACKGROUND OF THE INVENTION

Series connected battery stacks are being utilized in many applications such as telecommunication power supplies, electric vehicles (EVs), uninterruptible power supplies (UPS) and photovoltaic (PV) systems. Battery life is one of the major factors presently limiting the realization of economical systems. Series connected battery strings are prone to dramatic reduction in life and potential damage if high rate charging is continued after the onset of gassing. Differences in cell chemistry, and normal differences during repeated cycles of cell charge and discharge, lead to large non-uniformities in cell charge levels and correspondingly different cell terminal voltages. During charging of a battery composed of series connected cells, some cells will consequently reach full charge before others and before the overall battery terminal voltage reaches its nominal value. Such a process leads to overcharging of a subset of cells. If these cells are charged into the gassing phase, there can be significant degradation of the battery life. Maintenance of cells at an equalized charge level is critical for enhancing battery life. The same is true for strings of batteries connected together. For convenience, the term "battery" as used hereafter may refer to either a single cell or to a unit composed of internally or externally connected cells.

Different schemes and algorithms have been developed to achieve battery charge equalization. One approach which has been widely applied to minimize irregularities among battery modules has been regular charging at raised voltage levels. In this case, all batteries are further charged until they can be safely assumed to be fully charged regardless of their actual state of charge. This can adversely affect the lifetime of the batteries in addition to increasing the power consumption within the battery stack. Finally, the battery utilization is reduced due to the large difference between the working and discharge voltages.

Another algorithm uses a multi-step constant current charging. See, C. C. Chan, et al., "A Microprocessor Based Intelligent Charger for Electric Vehicle Lead Acid Batteries," Electric Vehicle Symposium, EVS-10, pp. 456–466, Hong Kong, 1990. This charging process starts with the maximum current the charger can deliver to the battery pack at low state of charge. As the state of charge builds up, the charging current is reduced in steps. Rest (cooling) periods are also incorporated in the algorithm to minimize temperature differences between the cold and warm batteries. Pulse equalization charging is applied at low current levels to improve the battery capacity. The batteries are normally maintained at the fully charged state before use using pulse trickle charging.

Other schemes and algorithms have been reported as well. However, since all of these schemes deal with the battery pack as a whole, individual battery (cell) equalization cannot be easily achieved. To prevent the adverse effects of unequalized charging of batteries, individual batteries need to be maintained at an equalized charge level. The fact that individual batteries should have the same voltage level once they have reached the final state of charge can be utilized to achieve this task.

A simple approach to equalize the batteries in a stack is to use bypass resistive shunts across each individual battery. The amount of current drawn by the shunt elements is proportional to the individual battery voltage, which results in more current being diverted to the shunt as the battery voltage increases. This will tend to reduce the voltage differences between the different batteries within the stack since higher voltage batteries will be further discharged by the shunt elements. One drawback of this approach is that the recovered energy is being converted into additional losses in the shunt elements. In addition, the amount of current drawn by the shunt elements is not regulated. As a result, the battery voltages are not fully regulated.

To regulate the current drawn by the shunt elements, active circuitry can be used. The use of individual cell equalizers (ICE) is one such approach. See, D. Bjork, "Maintenance of Batteries—new trends in batteries and automatic battery charging," INTELEC Conf. Proceedings, pp. 355–360, 1986; S. Bergvik, "Prolonged Useful Life and Reduced Maintenance of Lead-Acid Batteries by Means of Individual Cell Voltage Regulation," INTELEC Conf. Proceedings, pp. 63–66, 1984. The ICE is a voltage controlled current shunt which diverts the current away from the cell during trickle charging. This scheme prevents fully charged cells from getting overcharged while undercharged modules can still be trickle charged. In this scheme, the amount of lost energy is minimized since the shunt circuitry is only active when the cell voltage exceeds the preset level.

The ICE scheme is best suited for low charge/discharge current levels (0.1%–1%). In these applications, the active devices can be signal level devices where the maximum shunt current is on the order of few hundred milliamps, which limits the energy dissipated in the shunt resistors.

In the above mentioned schemes, the recovered energy is dissipated into the resistive current shunts. As a result, these dissipative equalization schemes are best suited for low power applications and/or low current charge/discharge rates to minimize the lost energy.

In applications such as electric vehicles (EVs), the current charge/discharge rates are relatively high (10%–100%), and the charge/discharge times are quite short. As a result, the charge equalization currents could be of the same order of magnitude as the charge and discharge currents. Thus, to minimize energy loss and optimize performance of the batteries, non-dissipative equalization techniques must be used.

One approach to achieving charge equalization at high charging rates utilizes isolated dc-to-dc converter modules across each battery cell. An example of this approach is a fly-back dc-to-dc converter connected across each battery module. This approach is best suited for large battery systems where a group of batteries have a dedicated dc-dc converter. When the voltage of a given battery module exceeds a preset voltage level, the excess energy is transferred back to the battery bus, thus allowing the battery voltage to be precisely regulated. The control signals for the power semiconductor switches are derived via simple comparative circuitry which detects the deviation of the module voltage from the average preset value. An isolation transformer is required for each series battery to provide the required level shifting.

A variation of this approach involves using bi-directional dc-to-dc converters across each battery cell/module is discussed in H. Schmidt, et al., "The Charge equalizer—A New System to Extend Battery Lifetime in Photovolatic Systems, U.P.S. and Electric Vehicles," INTELEC Conf. Proceedings, pp. 146–151, 1993. Using this approach, energy can be transferred from each battery module to the main battery bus and vice versa. During charging, the voltages of individual batteries are regulated by transferring the excess energy to the battery bus. During operation (discharging), energy can be transferred from the battery stack to weak batteries, thus maintaining all batteries at the same level and improving the utilization of the battery stack. Similar to the previous approach, the driving signals for the semiconductor switches are derived using simple comparative circuitry which activates the appropriate side of the converter.

The problem with these approaches is that a dedicated dc-to-dc converter is used for each battery module. In addition, the dc-dc converter and the transformer winding have to be rated for the full dc bus voltage. As a result, such equalizers must be custom designed and cannot be modularized for use with different battery bus voltages.

In the previously described schemes, a dedicated dc-to-dc converter across each battery is used. As a result, the number of active switches and hence the number of control circuit elements is quite high. To minimize the required hardware, a centralized equalizing converter with a multi-winding transformer can be used. The simple implementation can be realized via the use of a single isolated dc-to-dc fly-back converter with multi secondary windings as described in H. Schmidt, et al., "The Charge equalizer—A New System to Extend Battery Lifetime in Photovolatic Systems, U.P.S. and Electric Vehicles, " INTELEC Conf. Proceedings, pp. 146–151, 1993. The primary side is connected to the battery bus while each of the secondary windings is connected across each battery or group of batteries. Consequently, the number of secondary windings is the same as the number of batteries. In this approach, the battery voltages are precisely regulated by transferring energy from the battery bus to the weakest battery within the stack. Ideally, the converter is idle until a weak battery is detected. When the switch is closed, energy is stored in the magnetizing inductance of the transformer, which is later transferred to the low voltage batteries upon the switch turn-off. Note that all the coils are wound on a common core which dictates that all voltages will be the same. Ideally, the largest portion of the stored energy will be directed to the lowest voltage module without any additional control. In reality, this scheme has fairly high sensitivity to the leakage inductance between secondary windings.

Another approach which utilizes a centralized equalizing converter is the forward converter with a multi-winding transformer. A two switch forward converter can be used. See, N. H. Kutkut, et al.; "Charge Equalization for series Connected Battery Strings," IEEE IAS Annual Meeting, October 1994, pp. 1008–1015; N. H. Kutkut, et al., "Design Considerations for Charge Equalization of an Electric vehicle Battery System," IEEE APEC Conf. Rec., pp. 96–103, 1995; D. M. Divan, et al., "Battery Charging Using a Transformer with a Single Primary Winding and Plural Secondary Windings", U.S. Pat. No. 5,659,237, 1997. The voltage source voltage can be the same as the battery bus voltage. When a low voltage battery is detected, the converter is activated to transfer energy from the overall battery stack to the weakest battery. The individual battery voltages are regulated by controlling the duty cycle of the power MOSFETs.

Other approaches rely on utilizing a centralized multi-winding transformer. The equalizer/diverter circuit consists of isolated fly-back converter modules across each battery. The transformer coils are tightly coupled and are wound on a common core. In addition, the turns ratio is nearly unity. If a battery becomes overcharged, the corresponding switch is turned on, thus storing energy in the magnetizing inductance of the transformer. When the active switch is turned off, the stored energy is distributed among all batteries with most of the energy directed to the weakest battery. This allows direct energy transfer from healthy batteries to weak batteries during both charging and discharging. If more than one battery becomes overcharged, the battery with the highest voltage will dominate and feed energy to the weakest battery within the stack.

The number of windings can be further reduced if a forward type converter is used. A modified current diverter with a centralized multi-winding transformer with forward converter modules can be used. In this case, the number of secondary windings is the same as the number of battery modules. In addition, no rectifying diodes are required since the MOSFETs' anti-parallel body diodes are used for rectification.

Implementing any of the foregoing schemes for large series connected battery banks is rather tedious because a transformer with multiple windings is needed, and interconnecting these windings to the different batteries could become quite complex. In addition, these approaches cannot be modularized because the number of secondary windings has to match the number of batteries or group of batteries.

SUMMARY OF THE INVENTION

In accordance with the present invention, a battery equalizer module is provided for series connected strings of batteries for efficiently and economically equalizing the charge on the string of batteries. All of the modules may have the same construction, allowing reduction of manufacturing costs and inventory from the standardization of the modules, and enabling all modules to be constructed with standardized components that need be rated only for the normal charging or equalization current. The modules may be constructed to provide unidirectional transfer of charge down the battery string and then back to the first battery in the string, or bi-directional distribution of charge up or down the battery string from the higher charged batteries to the lower charged batteries in the string.

A unidirectional battery equalizer module in accordance with the invention includes a transformer having a primary and a secondary with the same number of turns, a controllable switching device connected in series with the primary between a high side terminal and a first intermediate terminal, and a diode connected in series with the secondary between a low side terminal and a second intermediate terminal of the module. The module may then be connected to a series connected pair of upper and lower batteries with the high side terminal connected to the high side of the upper battery, the first and second intermediate terminals connected to a junction between the two batteries and the low side terminal connected to the low side of the lower battery. A controller is connected to the controllable switching device to control it to switch on and off at a selected frequency to transfer charge from a more highly charged upper battery in the pair to a lesser charged lower battery. Preferably, the controller is turned on to switch the controllable switching device when the upper battery in the pair is charged to a voltage level higher than the voltage of the lower battery by a selected value, thus disabling the equalizer when the voltage difference between the two batteries is relatively low to avoid unnecessary operation of the module. When the controllable switching device is being turned on and off, turn on of the switching device causes a charging current to flow through the switching device and the primary of the transformer from the first battery in the pair. The transformer polarity is set such that the diode on the secondary side is forced into conduction, thereby transferring charge from the upper battery to the lower battery of the series connected pair. The leakage inductance acts as a driving impedance for the charging current, thus limiting the charging current in the circuit. Turn off of the switching device interrupts the charging current. The last module is connected to the lowest battery in the string of batteries with the high side terminal of the module connected to the high side of the lowest battery and the first intermediate terminal of the module connected to the low side of the lowest battery. The second intermediate terminal of the module is connected to the high side of the first battery in the string and the low side terminal of the last module is connected to the low side of the first battery. When the last battery in the string has a voltage level that exceeds the voltage level of the first battery by a selected value, the switching device in the last module is turned on and off periodically at a selected frequency such that when it is turned on a charging current flows through the switching device and the primary of the transformer from the last battery and is coupled to the secondary causing current flow through the secondary winding to the first battery. The transformer polarity is set such that the diode on the secondary side is forced into conduction, thereby transferring charge from the last battery to the first battery in the string of batteries. The leakage inductance acts as a driving impedance for the charging current, thus limiting the charging current in the circuit. Turn off of the switching device interrupts the charging current. In this manner, charge is transferred from the last battery in the string to the first battery in the string.

A bi-directional battery equalizer circuit module in accordance with the invention includes a transformer having a primary and a secondary with the same number of turns, a first controllable switching device connected in series with the primary between an intermediate terminal and high side terminal, a second controllable switching device connected in series with the secondary between a low side terminal and the intermediate terminal, a first free-wheeling diode connected to a junction between the secondary and the second controllable switching device and to the high side terminal to allow diversion of free-wheeling current around the transformer, and a second free-wheeling diode connected to the low side terminal and to a junction between the primary and the first controllable switching device to allow diversion of free-wheeling current around the transformer. A controller provides switching signals to the first and second controllable switching devices to turn a selected one of them on and off at a frequency thereby to equalize the charge in a pair of batteries when connected thereto with the high side terminal connected to the high side of the pair, the low side terminal connected to the low side of the pair, and the intermediate terminal connected to a junction between the pair, by transferring charge from the more highly charged of the pair of batteries to the lesser charged of the pair of batteries. Preferably, the controller is turned on when the voltage on one of the batteries in the pair exceeds the voltage on the other battery by a selected value, and turns on and off the one of the first and second switching devices which is connected around the battery with a higher voltage level, such that when the switching device is turned on current flows from the more highly charged battery through the switching device and the primary winding of the transformer to which the switching device is connected, and is coupled to the secondary causing current flow through the secondary winding. The transformer polarity is set such that the diode on the secondary side is forced into condition, thereby transferring charge to the lower voltage battery. The trapped leakage energy on the primary side is also transferred to the lower voltage battery through the free-wheeling diode which is connected to that battery around the transformer. The leakage inductance acts as a driving impedance for the charging current, thus limiting the charging current in the circuit. Turn off of the switching device interrupts the charging current. In this manner, charge is transferred to the lower voltage battery.

The modules of the present invention are connected to a string of series connected batteries in staggered pairs. The high side terminal of a lower module is connected to the junction between batteries at which the intermediate terminal of the module above it is connected, and the intermediate terminal of the lower module is connected to the junction at which the low side terminal of the module above it is connected. Thus, for the unidirectional module, when an upper module diverts current to a lower battery in the pair to which the module is connected, and that battery is more highly charged than the battery immediately below it, the next lower module will divert charge from the more highly charged battery in the pair to the lesser charged battery, and so forth down the string of batteries until all of the batteries are equalized. Each bi-directional module will transfer charge up or down the string to the less charged battery to which it is connected, thereby efficiently distributing charge among the batteries in the string to equalize them. Each of the modules carries out its equalization function independently of and without interfering with the other modules and without requiring centralized control of the various modules. Thus, a standardized charge equalizer module in accordance with the present invention may be used with strings of batteries without regard to the specific number of batteries in the string.

The preferred equalizer modules in accordance with the present invention naturally reduce the charging current as the voltages across the two batteries to which the module is connected are equalized. The present invention also provides for a controller for controlling the switching of switching devices in a battery charge equalizer module which may include a fly-back type equalizer which does not naturally reduce the charging current as the voltages become equalized. A controller of this type includes a voltage comparison circuit, having terminals connected to the voltages across the high side and the low side of the two batteries and to a junction between the batteries, that provides an output signal proportional to the difference in the voltages between the batteries, and a current differential amplifier connectable on a line leading to the battery being equalized by the module to monitor the current in the line and providing an output signal proportional to the current. A hysteresis comparator receives the signals proportional to the voltage difference and the current, compares the signals, and provides an output signal to a pulse generator and gate drive circuit to switch the switching device in the charge equalizer module on and off when the difference between the signals exceeds a selected value, the comparator having hysteresis, wherein the level of the charging current is reduced as the voltage difference between the two batteries becomes lower.

Further objects, features and advantages of the invention will be apparent from the following detailed description when taken in conjunction with the accompanying drawings.

DETAILED DESCRIPTION OF THE INVENTION

Figure 1:
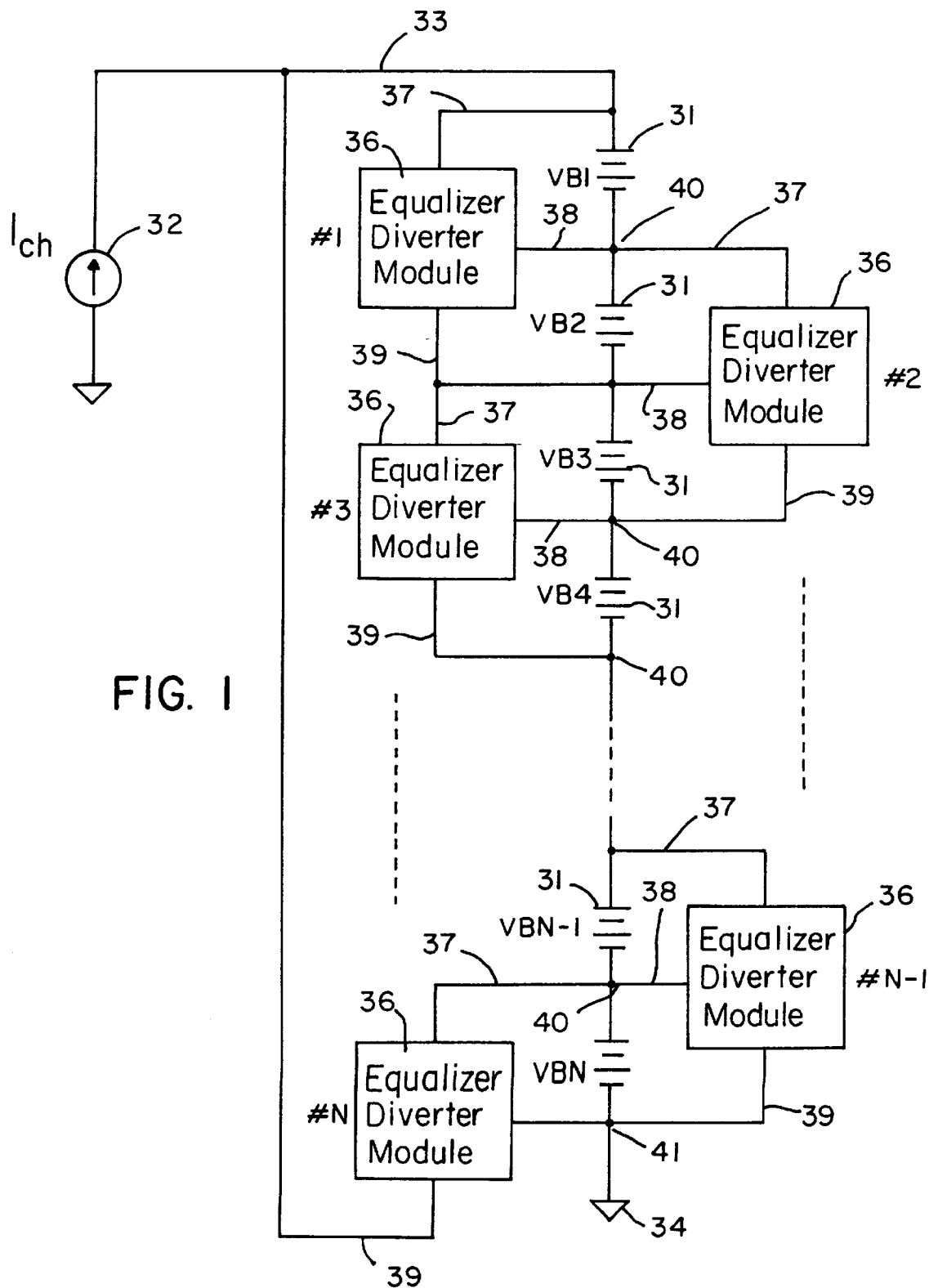
FIG. 1 is a general schematic diagram of a unidirectional modular battery charge equalizer system.
Figure 2:
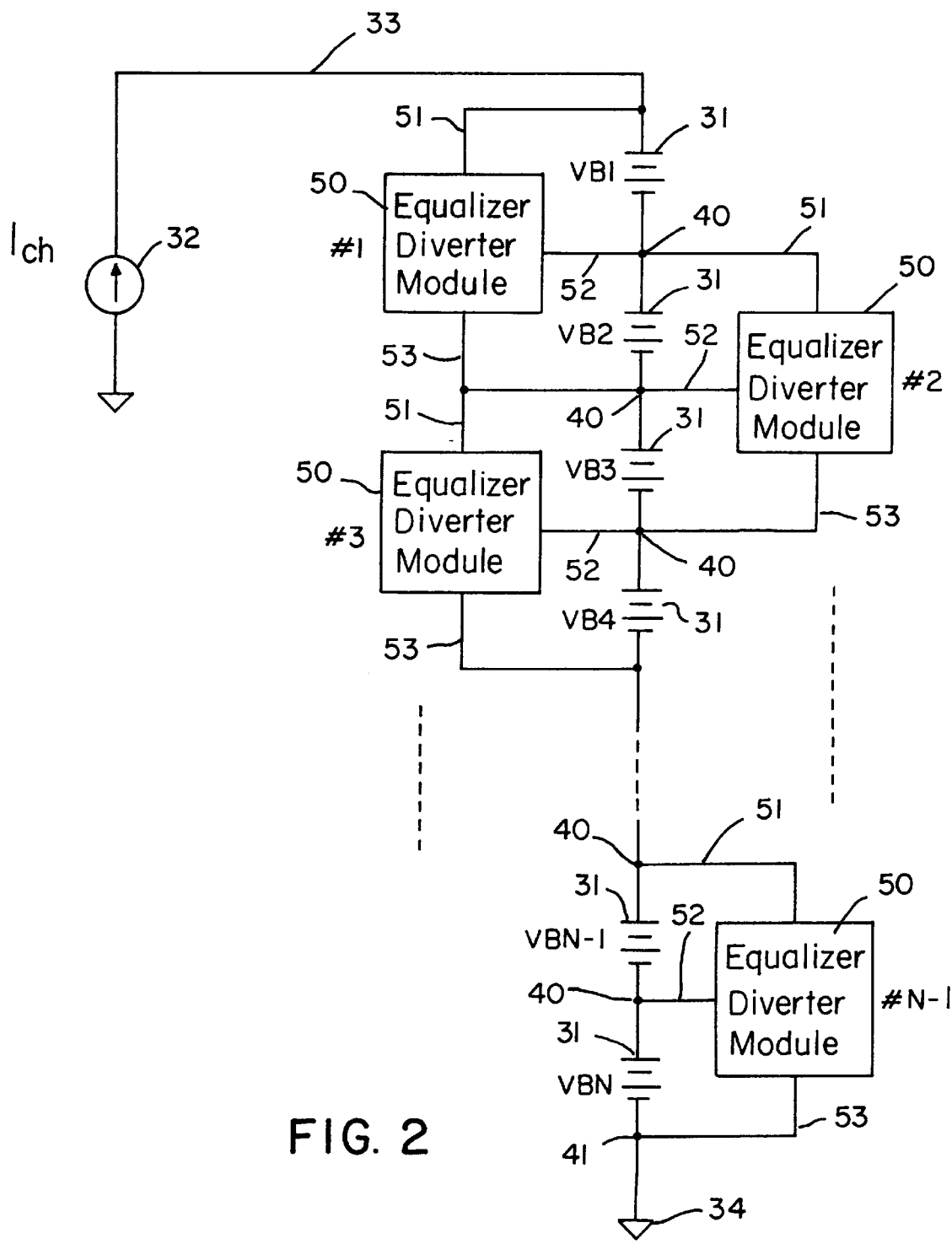
FIG. 2 is a general schematic diagram of a bi-directional modular battery charge equalizer system.

The present invention utilizes modular non-dissipative charge equalizers and current diverters in which a charge equalizer module is connected across each pair of batteries to ensure balancing between the individual batteries within the pair. The charge equalizer modules are staggered in a charge equalization system for several batteries to achieve equalization for the entire stack of batteries. The modules can be constructed to transfer energy in one direction along a battery stack (unidirectional) as illustrated in FIG. 1, or in both directions (bidirectional) as shown in FIG. 2. FIGS. 1 and 2 are generalized diagrams showing the two possible arrangements for modular charge equalizers.

With reference to FIG. 1, a string of "N" batteries 31 are connected together in series and are illustratively shown being supplied with current from a charger 32 which provides the charging current $I_{ch}$ on a line 33 to the string of batteries and thence back to the charger 32 through a common line 34. An equalizer module 36 is connected across each adjacent pair of batteries 31 in the string of batteries, with each module 36 having a high side terminal line 37, an intermediate terminal line 38 and a low side terminal line 39. As illustrated, the high side terminal line 37 is connected to the high or positive side of a first battery in the pair, the intermediate terminal line 38 is connected to the node 40 between batteries, and the low side terminal line 39 is connected to the low or negative terminal of the second battery 31 in the pair. The equalizer/diverter modules 36 are connected to the pairs of batteries in a staggered fashion as shown, with the second module 36 having its high side terminal line 37 connected to the node to which the intermediate terminal line 38 of the first module is connected and having its intermediate terminal line 38 connected to the node 40 to which the low side terminal line 39 of the first module is connected, and so forth, until the last module 36—which has its intermediate terminal line 38 connected to a node 41 at the low side of the last battery. The low side terminal line 39 of the last module 36 is then connected back to the input line leading to the high side of the first battery 31 in the stack of batteries. As explained further below, each equalizer diverter module 36 transfers energy downwardly toward the bottom of the stack of batteries. For example, if the first battery in the stack is more highly charged than the next battery downward in the stack, the first equalizer module transfers charge from the first battery to the second battery. If the second battery in the stack is more highly charged than the first battery, the charge is not transferred. Similarly, for the second equalizer module, if the second battery is more highly charged than the third battery, the module transfers charge from the second battery to the third battery. If the third battery is more highly charged then the second battery, then it does not. Each module 36 transfers energy in accordance with this pattern between the pairs of batteries to which it is connected except for the last module 36 in the string. If the battery to which this module is connected between its high side terminal line 37 and its intermediate terminal line 38 is more highly charged than the first battery in the string, then the last module 36 transfers energy on the line 39 to the first battery 31 in the string.

With reference to FIG. 2, the bi-directional equalizer modules 50 are connected across the string of batteries 31 in the same manner as the modules 36, with each of the modules 50 having a high side terminal line 51 connected to the high side of the first battery in the pair, an intermediate terminal line 52 connected to the node between the two batteries in the pair, and a low side terminal line 53 connected to the low side of the second battery in the pair. The modules 50 can transfer charge in either direction. The equalizer module 50 transfers charge between the two batteries 31 to which it is connected from the more highly charged battery to the less highly charged battery.

The unidirectional modules 36 and the bi-directional modules 50 may perform both a current diversion function and a charge equalization function. The current diversion function is carried out during high rate charging. In this case, the modules divert the charging current around the overcharged battery to the next battery within the stack. This allows the rest of the stack to be fully charged while avoiding overcharging of healthy batteries. In the charge equalization function, when high rate charging is terminated, and the modules act as charge equalizers wherein energy is transferred from overcharged batteries to weak batteries until all batteries within the stack are equalized. This is preferably carried out during idle periods of time when the batteries are not being charged or discharged.

The use of modules 36 and 50 for equalizing series battery strings allows for standardization of the modules for use in any application regardless of the number of batteries or the physical location of the batteries. This is an important advantage since the modules preferably do not need to be customized for particular applications and the cost of the modules can be reduced due to standardized production of the modules. In addition, because each module is connected across a pair of cells, they are easily adapted to any physical layout of a battery string and, hence, can be retrofit to existing battery systems.

Figure 3:
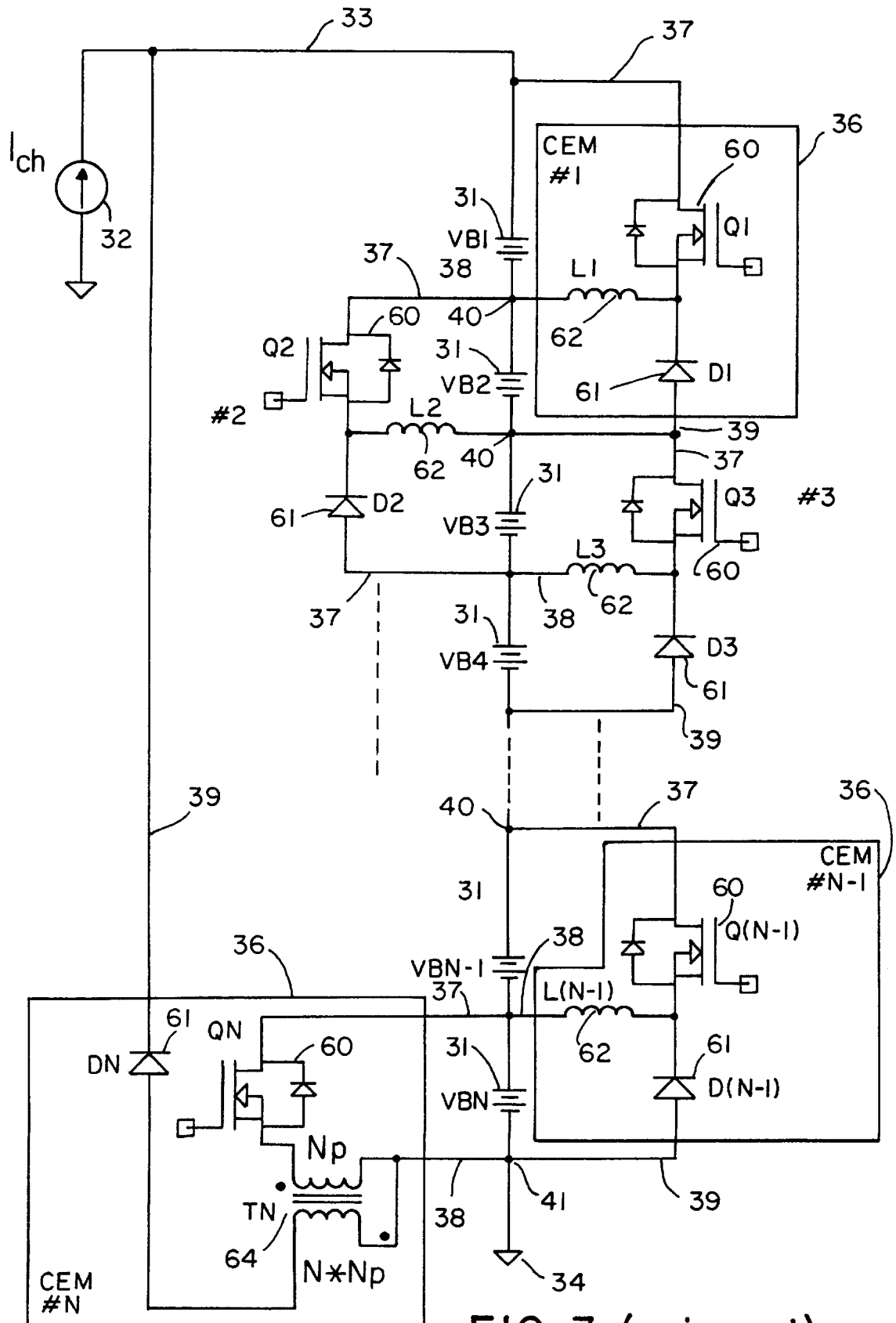
FIG. 3 is a schematic circuit diagram of a prior art implementation of a unidirectional charge equalizer system using fly-back converter modules.

A prior configuration for implementing the unidirectional modules 36 with a power semiconductor switch 60 (e.g., a MOSFET), a free-wheeling diode 61, and an energy storage inductor 62 is shown in FIG. 3. Such a configuration is described in N. H. Kutkut, "A Modular Non-Dissipative Current Diverter for EV Battery Charge Equalization," IEEE APEC '98 Conf., Anaheim, Calif., pp. 686–690, February 1998. For a stack having "N" batteries, the total number of active switches, inductors and free-wheeling diodes is N. For the last module 36 in the stack, to provide an energy flow path around that cell, a fly-back converter arrangement is used incorporating a transformer 64. During normal charging operation, the modules 36 are disabled and the charging current flows serially through all of the batteries. When a battery voltage exceeds a certain threshold, signifying a full state of charge, the corresponding module 36 is enabled to divert current away from that module and into the next lower module in the stack. For example, if the first battery 31 reaches its full state of charge first, the switch 60 in the first module 36 is turned on and energy is stored into the inductor 62. When the switch 60 is turned off, the stored energy in the inductor is delivered to the second battery 31 in the stack. If the average current drawn by the module is the same as the charging current, the net current into the first battery is zero while the average current through the rest of the battery stack is maintained at the charging current. If the next battery in the stack is undercharged, its corresponding module is not activated, i.e., the switch 60 connected around that battery is not turned on, so that the full charging current flows through that battery. As illustrated in FIG. 3, a fly-back converter configuration is used for the last module 36 in the stack to provide a flow path for recovered energy from the last battery. To provide an energy flow path from the last module 36 to the first module, a fly-back transformer 64 is used. In this case, if the last battery in the stack becomes overcharged, the switch 60 in the last module is turned on, thus storing energy in the magnetizing inductance of the transformer 64. When the switch 60 is turned off, the stored energy is recovered and fed back to the overall battery bus on the line 39. This allows non-dissipative energy recovery for the last battery as well. It is noted that the turns ratio of the fly-back converter transformer 64 is the same as the number of battery modules, namely, N. The rating of the free-wheeling diode 61 in the last module 36 is $N*V_b$, where $V_b$ is the average battery voltage. In the implementation of FIG. 3, the last module 36 in the stack differs from the other modules by virtue of the fly-back transformer 64.

Figure 4:
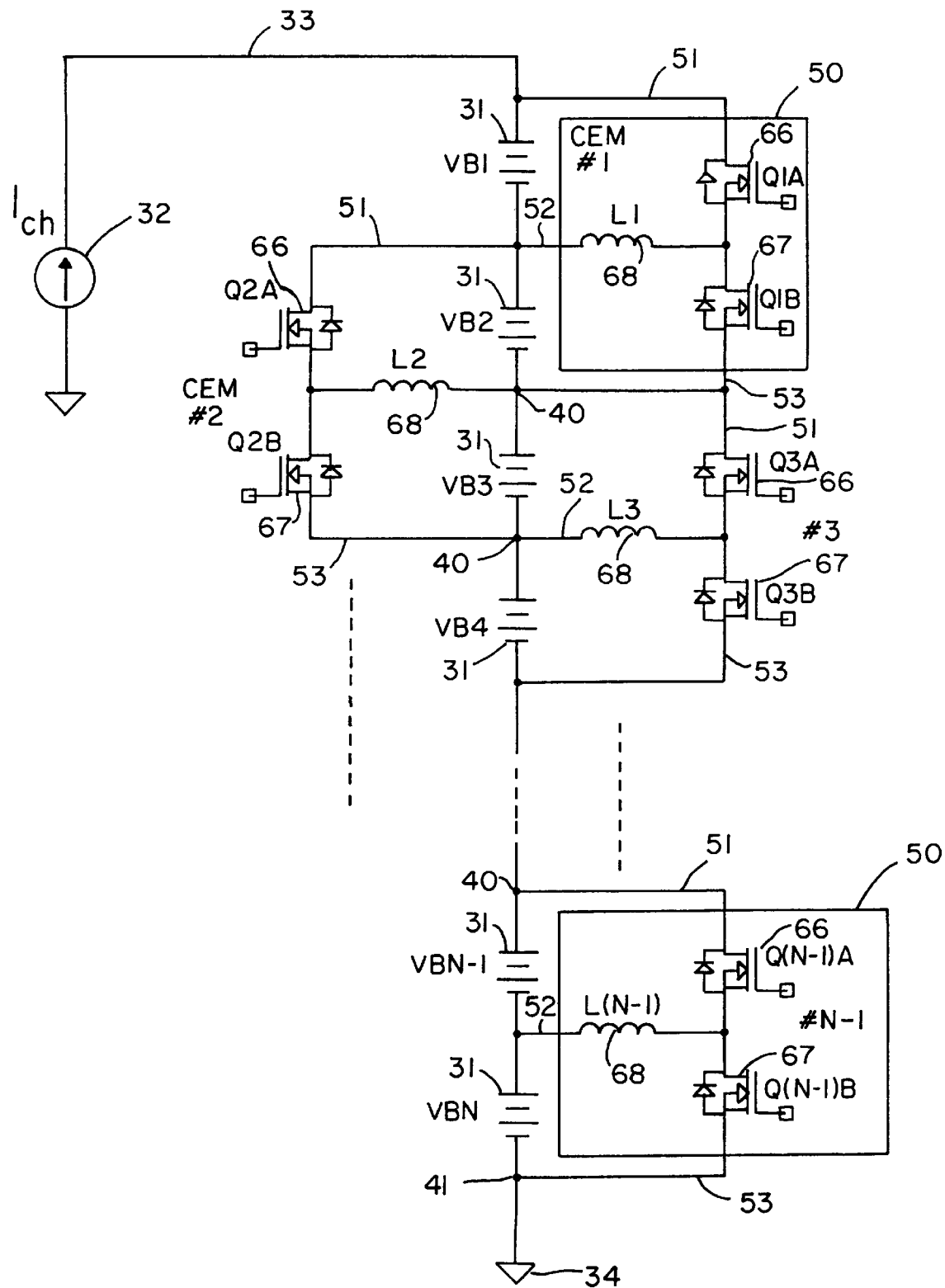
FIG. 4 is a schematic circuit diagram of a prior art implementation of bi-directional battery charge equalizer system.

A prior implementation for the bi-directional modules 50 is illustrated in FIG. 4. See N. H. Kutkut, ibid. Each module 50 includes a pair of switches 66 and 67 and an inductor 68 connected between the switches 66 and 67 and the intermediate line 52. These modules function as a half-bridge converter feeding an inductive load. If a battery becomes overcharged, the corresponding switch (e.g., MOSFET) 66 or 67 connected around it is turned on, and energy is stored in the magnetic core of the shunt inductor 68. When the switch is turned off, the stored energy is diverted to the module below or above it, depending on the direction of current flow in the shunt inductor 68. As a result, each pair of batteries 31 within the stack are equalized on a continuous basis. For a number of batteries equal to N, the number of active switches is 2N−2, while the number of inductive shunts is N−1. The amount of diverted current can be either a portion of the charging current or the full charging current in high current charging applications. During operation, each of the modules 50 provides equalization by directing energy from healthy cells to the weaker cells within the stack.

Figure 5:
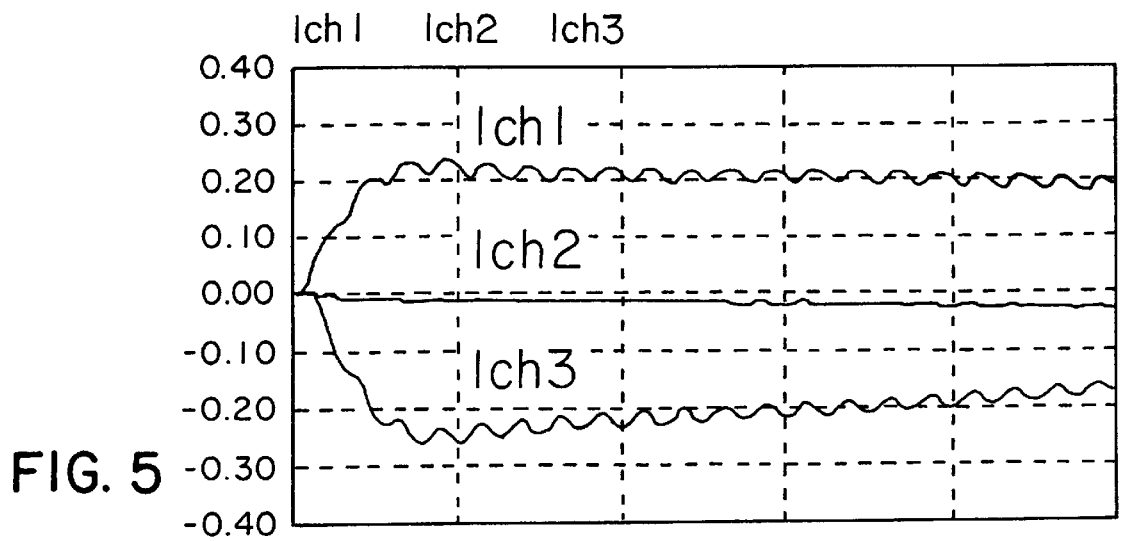
FIG. 5 are graphs showing the charging currents for simulations for a three battery fly-back type equalizer system of the type shown in FIG. 3.
Figure 6:
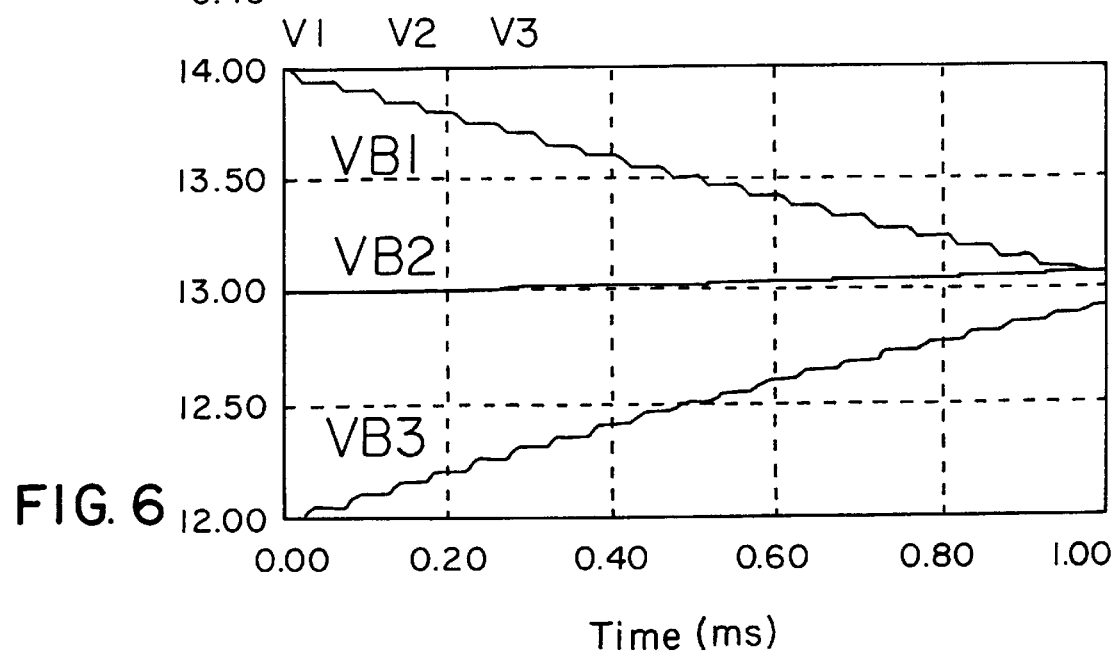
FIG. 6 are graphs illustrating battery voltages for a three battery fly-back type equalizer system of the type shown in FIG. 3.

FIGS. 5 and 6 show the charging current and the battery voltage, respectively, for a simulation in which two unidirectional modules 36 were used to equalize a three cell battery stack in which, for simplicity, the storage elements were assumed to be capacitors (rather than batteries). The initial battery (capacitor) voltages were 14V, 13V and 12V from top to bottom, respectively, the value of the inductor 62 was selected to 110 $\mu$H and the switching frequency was selected to be 20 kHz. FIGS. 5 and 6 show the resulting average charging currents and battery voltages over a 1 ms period of time. As illustrated in FIG. 6, the first battery (capacitor) voltage decreases while the voltage of the third increases due to an energy transfer from the first battery (capacitor) to the third. The second battery does not consume any charging current and all of the energy out of the first battery (capacitor) is directed to the weakest battery (capacitor) within the stack. Over time, it is seen that all of the voltages equalized as they approached the 13V level. The duty cycle has to be limited to ensure full reset of the stored energy before the start of the next cycle. When all of the batteries are equalized, the switches are disabled.

The approach of FIG. 3 depends on a fly-back based implementation where energy is stored in the main filter inductor 62 or the transformer 64 magnetizing inductance during the switch-on time and then transferred through the free-wheeling diode 61 to the next battery within the pair during the switch-off time. As a result, the charging process does not terminate until the switches are disabled. This may be observed from the current waveforms for the simulation in FIG. 5 where it is seen that the equalization charging currents remain constant during the equalization mode. This continuous charging subjects the batteries to higher charging and discharging rates throughout the equalization process, and, in addition, it reduces the effectiveness of the equalization function because high rate charging may degrade battery performance near the end of the charge cycle. Further, the unidirectional equalizer of FIG. 3 incorporates a non-standard module for the last module to provide a continuous energy flow path. The fly-back implementation is also prone to "hiccup" operation caused by the high level of charging currents near the end of equalization. During operation, the terminal voltages are affected by the battery internal resistance drop, which can be significant at a high charging current. When the equalization is terminated, the terminal voltages may vary enough to cause the equalizer to turn back on. This hiccup mode of operation can negatively impact battery performance and reduce the overall efficiency of the equalizer.

Figure 7:
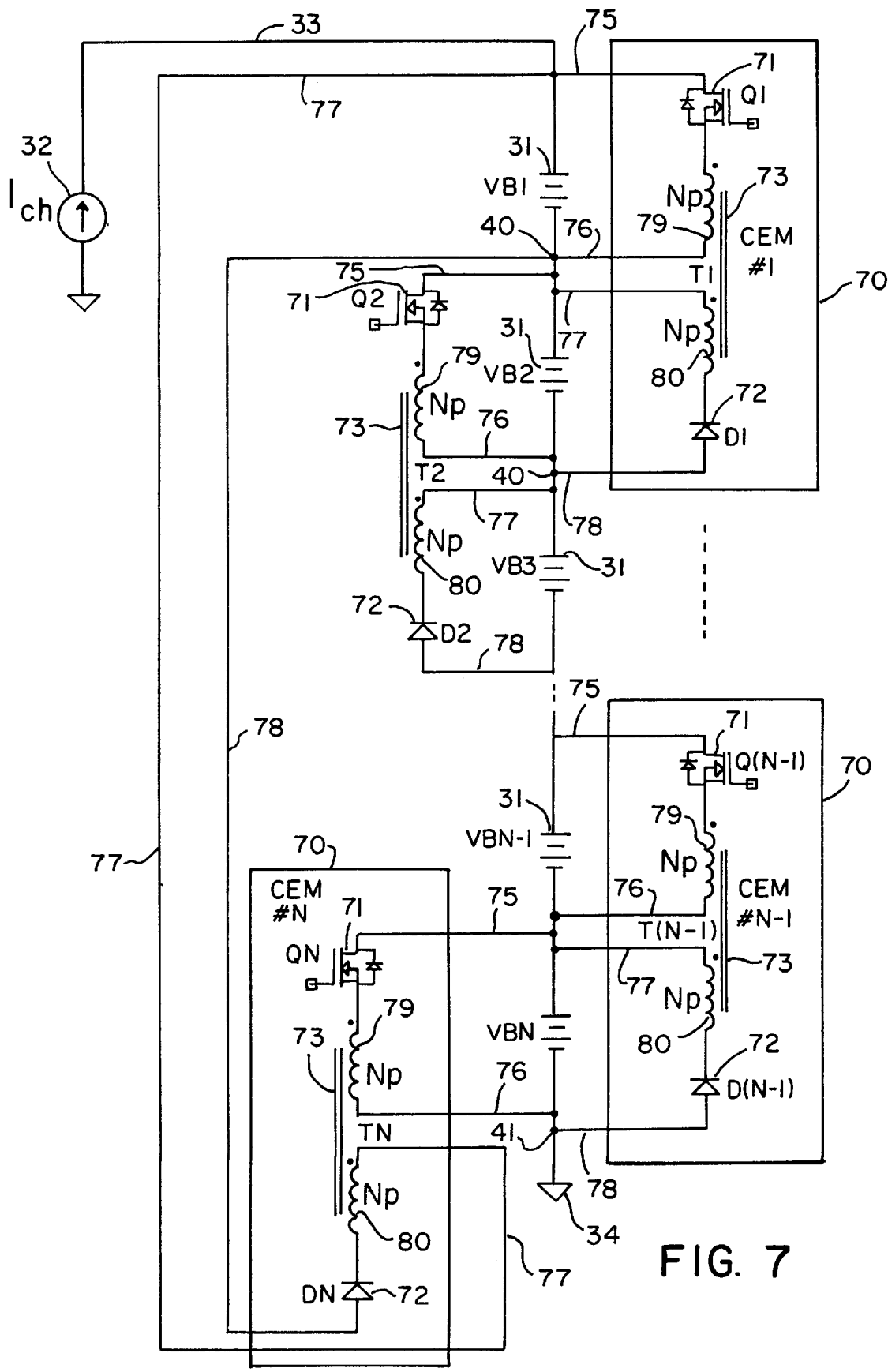
FIG. 7 is a schematic circuit diagram of a battery charge equalization system for multiple batteries utilizing unidirectional charge equalizer modules in accordance with the present invention.

In accordance with the present invention, a fully modularized forward converter unidirectional implementation of the present invention comprising standardized modules 70 is illustrated in FIG. 7. Each of the modules 70 includes a controllable switch 71 (e.g., a power MOSFET with body diode), a free-wheeling diode 72 and a two winding transformer 73. Each module 70 has a high side terminal line 75, two (first and second) intermediate terminal lines 76 and 77 and a low side terminal line 78. The intermediate terminal lines 76 and 77 are separately connected to the two windings 79 and 80 of the transformer 73. The number of turns for the primary winding 79 and the secondary winding 80 is the same, namely Np. It is noted that the last equalization module 70 is identical to all of the other modules. The output of its secondary 80 is connected via the second intermediate terminal line 77 and the low line 78 to the high side and low side, respectively, of the first battery 31 in the stack. In this implementation, the high terminal line 75 and the first intermediate terminal line 76 are connected to the high side and low side, respectively, of the first battery in each pair, while the second intermediate terminal line 77 and the low side terminal line 78 are connected from the secondary 80 to the high side and low side, respectively, of the second battery in each pair. The first battery in the string effectively functions as the second battery in the pair of which the last battery in the string is the first of the pair.

Figure 8:
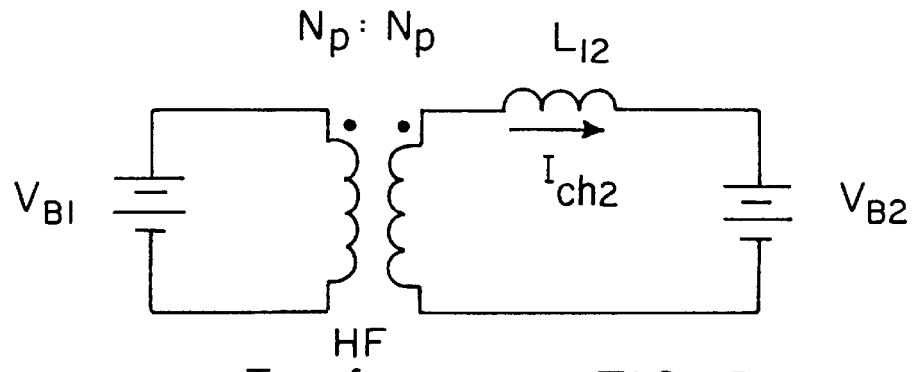
FIG. 8 is a simplified equivalent circuit for a charge equalizer module of the type shown in FIG. 7 connected to two batteries.

If one battery 31 within a pair gets overcharged, to say a voltage $V_{b1}$, its corresponding switch 71 is turned on. Given the transformer polarity illustrated by the dots in FIG. 7, the diode 72 will be forced into conduction as well. Because of the unitary turns ratio in the transformer, the equivalent circuit can be simplified to that shown in FIG. 8. The leakage inductance between the two windings will act at the main driving impedance for the charging current. It will be seen from FIG. 8 that the battery charging current is governed by the overcharged battery voltage $V_{b1}$, the second battery voltage $V_{b2}$, and the leakage inductance $L_{12}$ and is given by:

$$I_{CH2}(t) = \frac{V_{B1} - V_{B2}}{L_{12}} t$$

When both batteries are equalized, the charging current will be zero. Consequently, the forward converter based implementation of FIG. 7 reduces the stress on the main switches 71, and the required control is relatively simple where a natural feedback for the charging current is obtained without any active control. All that is needed is to compare each pair of batteries and if the difference exceeds a selected value, to activate the switch.

Figure 9:
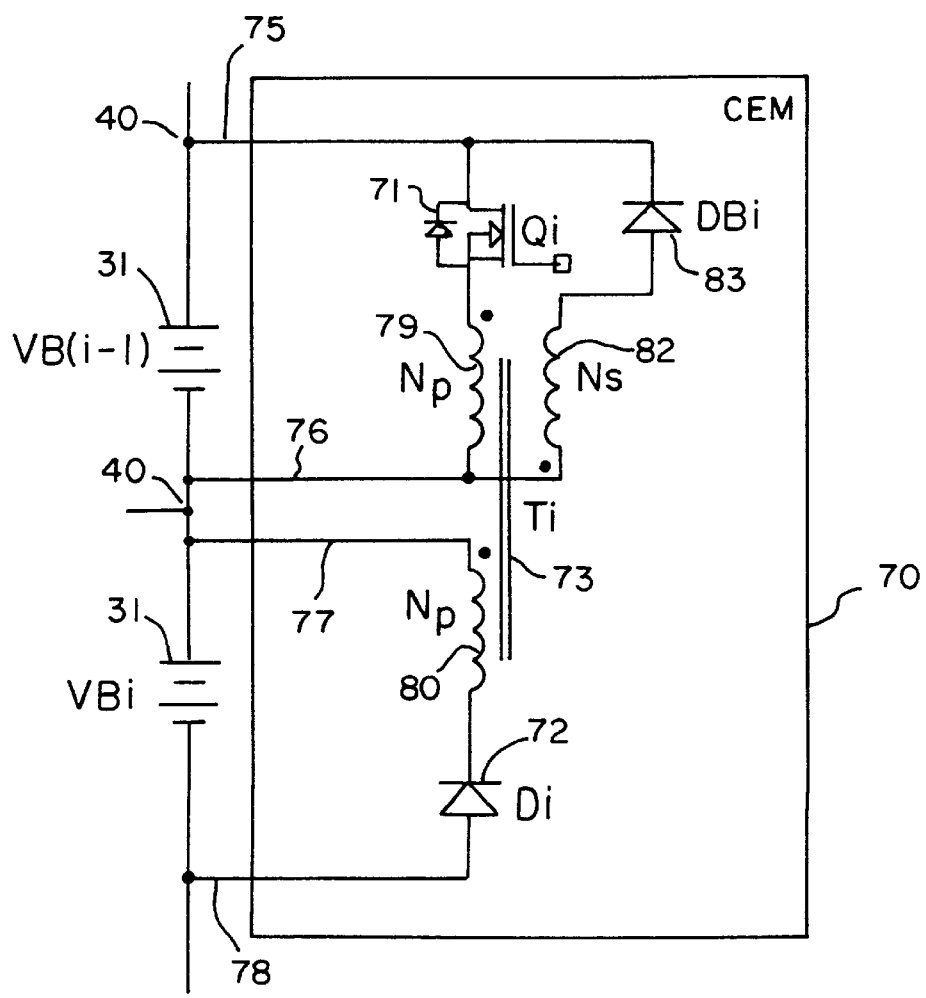
FIG. 9 is a schematic circuit diagram of a charge equalizer module of the type shown in FIG. 7 with the addition of an auxiliary reset winding.

It is preferable that a path be provided for the magnetizing energy to prevent the transformer 73 from saturating. This can be achieved in several ways to provide a reset for the stored magnetizing energy. One implementation utilizes an additional auxiliary winding 82 on the transformer 73 as shown in FIG. 9. The auxiliary winding 82 is connected with a diode 83 between the intermediate terminal line 76 and the high side terminal line 75. The number of turns for the auxiliary winding 82 must be less than the number of turns of the primary to ensure full reset before the start of the next cycle.

During charging, the switch 71 can be turned on to direct current around the upper battery to the lower battery if the upper battery is more highly charged, and left off otherwise.

Figure 10:
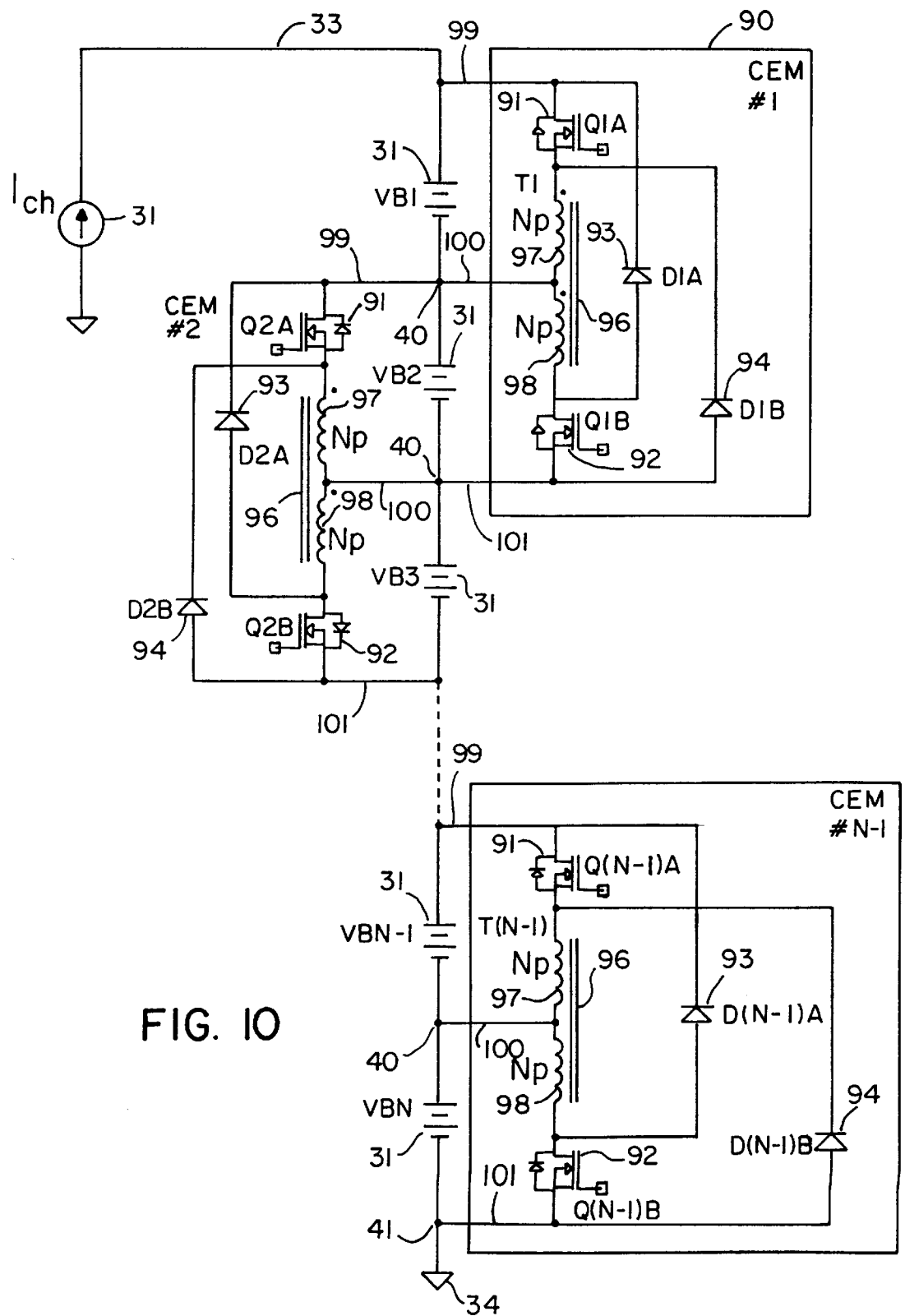
FIG. 10 is a schematic circuit diagram of a battery charge equalizer system for multiple series connected batteries with bi-directional charge equalizer modules in accordance with the present invention.

A bi-directional charge equalization module in accordance with the present invention is shown at 90 in FIG. 10. Each of the modules 90 includes a first controllable switch 91 and a second controllable switch 92 (e.g., power MOSFETs with body diodes) connected in a forward implementation with a first free-wheeling diode 93 and a second free-wheeling diode 94. The switches 91 and 92 along with their anti-parallel body diodes are used to transfer excess energy from one battery to another within each pair while the free-wheeling diodes 93 and 94 provide a reset path for the magnetizing energy of a transformer 96 which is connected between the two switches 91 and 92. The transformer 96 has a primary 97 connected to the switch 91 and a secondary 98 connected to the switch 92. A high side terminal line 99 is connected to the first switch 91, on intermediate terminal line 100 is connected to a node joining the primary 97 and secondary 98, and a low side terminal line 101 is connected to the second switch 92. The free-wheeling diode 93 is connected between the high side terminal line 99 and the junction between the secondary 98 and the second switch 92 to divert current around the transformer, and the free-wheeling diode 94 is connected between the junction between the first switch 92 and the primary 97 and the low terminal line 101 to direct current around the transformer. The current flow path is bi-directional and hence charge can be steered upwardly or downwardly if the first switch 91 or second switch 92 is turned on, respectively, depending on the state of charge of the individual batteries.

During charging, the switch 91 or 92 that is connected to the more highly charged battery may be turned on to divert current to the lesser charged battery.

Figures 11, 12:
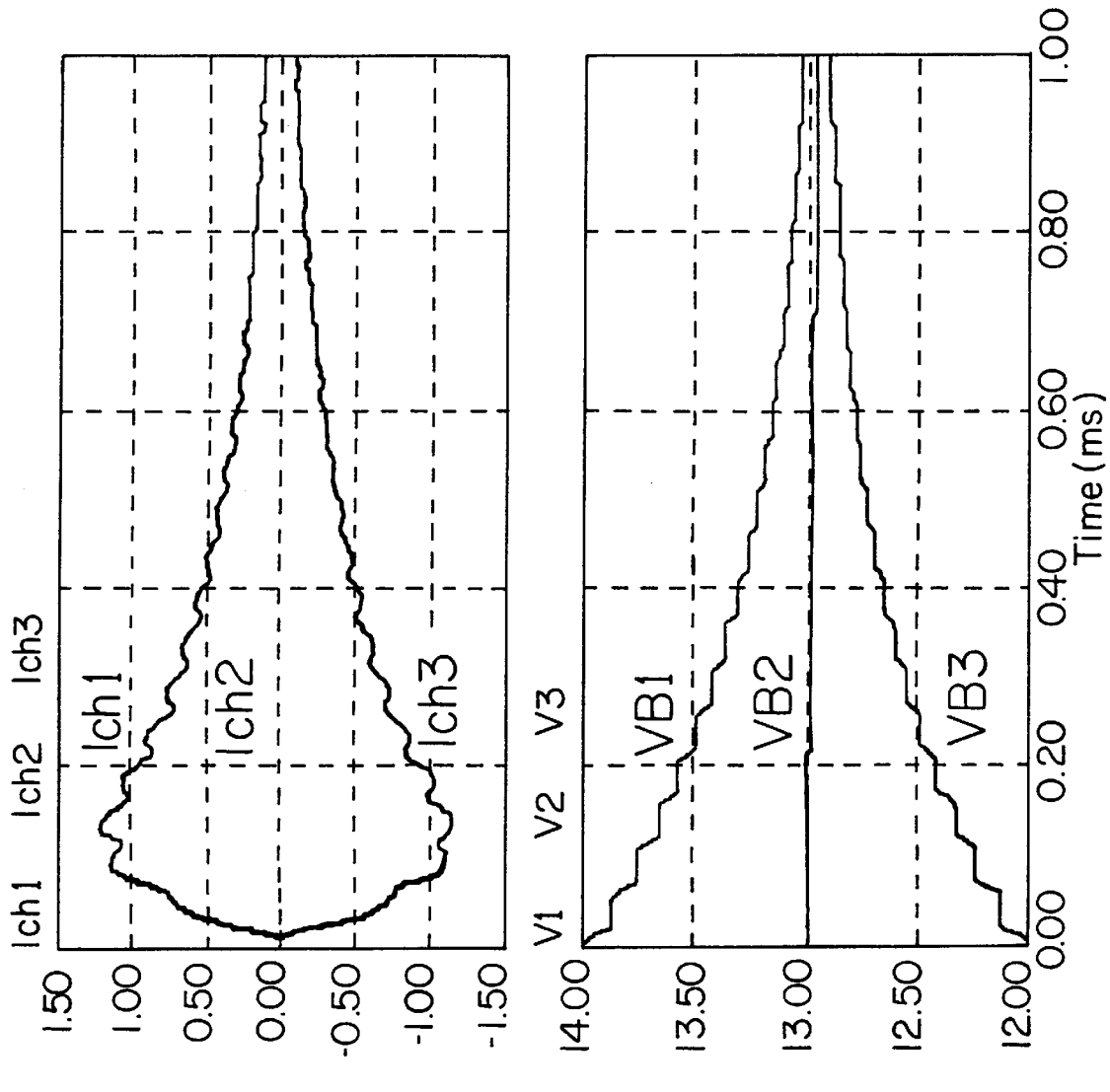
FIG. 11 are graphs illustrating the charging currents for a simulation for a three battery equalizer system utilizing the unidirectional charge equalizer modules of FIG. 7.
FIG. 12 are graphs illustrating the battery voltages for a three battery equalizer system utilizing the unidirectional charge equalizer modules of FIG. 7.

To compare the performance of the unidirectional module 70 with that of the prior unidirectional module 36, a simulation was performed (similar to that described above which resulted in the current and voltage waveforms of FIGS. 5 and 6). Two forward type unidirectional modules 70 were utilized to equalize three batteries (simulated by capacitors) connected in series. An auxiliary winding 82 of the type shown in FIG. 9 was utilized to provide a path for the magnetizing energy. For simplicity, the storage elements were assumed to be capacitors with initial capacitor voltages of 14V, 13V and 12V from top to bottom, respectively. The transformer leakage inductance was assumed to be 2 $\mu$H and the switching frequency of the switches 71 was selected to be 20 kHz. FIGS. 11 and 12 show the resulting average charging currents and battery voltages, respectively, over a 1 ms period of time. As illustrated in FIG. 12, the voltage of the first battery decreases while the voltage of the third battery increases due to energy transfer from the first battery to the third battery. It is also clear from FIG. 11 that all of the charging current of the first battery is employed to charge up the third battery. The second battery does not consume any charging current and all of the energy of the first battery is directed to the weakest battery within the stack. Over a short period of time, all of the voltages equalize as they approach the 13V level. As the voltages on the individual batteries equalize, the charging currents decrease, as shown in FIG. 11. When all of the voltages are equalized, the charging current naturally goes to zero. This provides a natural termination mechanism for the equalization process, reducing the stresses and improving the efficiency of the modules. This natural termination also prevents the equalizer modules from getting into a hiccup mode, because the charge current levels will be quite small when the batteries are fully equalized.

Figure 13:
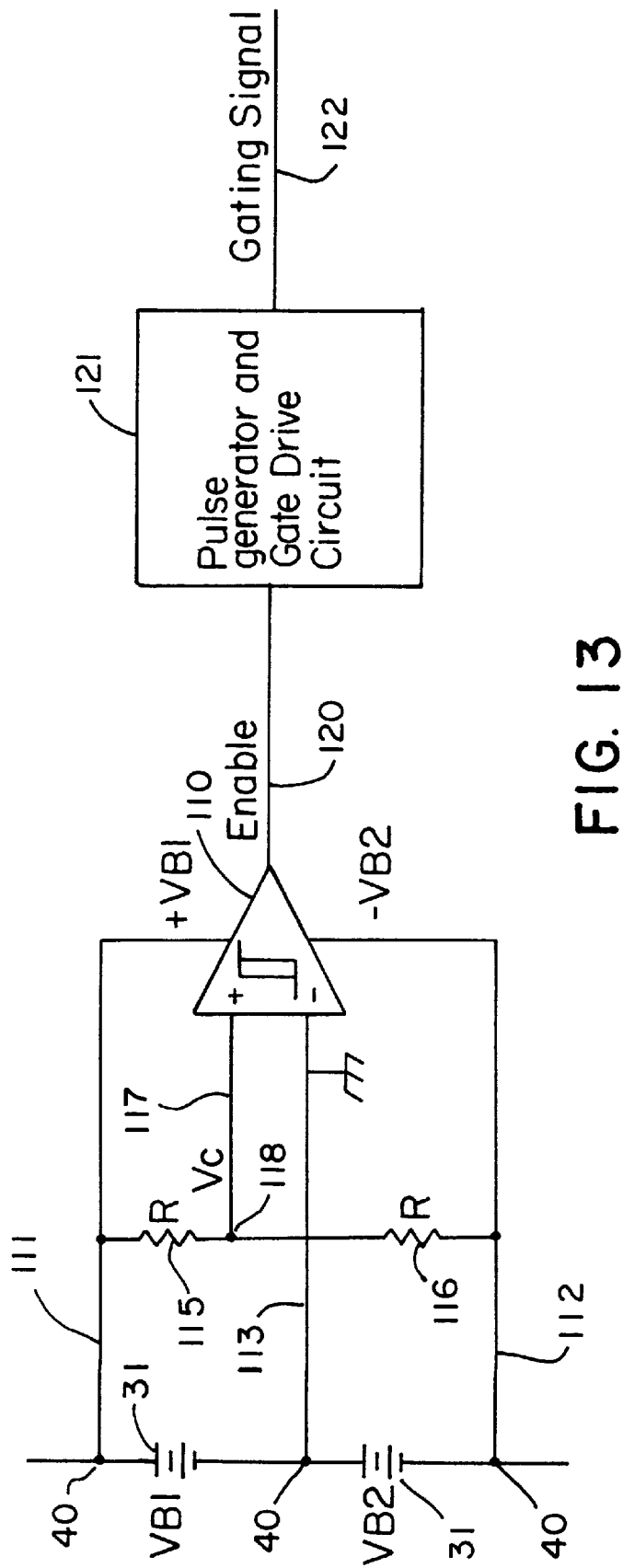
FIG. 13 is a schematic diagram of a controller for a unidirectional charge equalizer module in accordance with the invention.

In the present invention, control of the voltage balancing carried out by the unidirectional modules 70 or bi-directional modules 90 is preferably initiated when the difference in voltages between the two batteries in the pair exceeds a threshold and terminates when the difference in voltages declines below a threshold. An exemplary controller for the unidirectional module 70 is illustrated in FIG. 13. The controller of FIG. 13 utilizes a comparison circuit that includes a comparator 110 with hysteresis, which receives the voltage at the high side of the first battery $V_{b1}$ on a line 111 and which receives the low side voltage $-V_{b2}$ of the second battery on a line 112. The node 40 between the two batteries is connected via a line 113 to the – input of the comparator 110. A pair of resistors 115 and 116 of resistance R are connected in series between the lines 111 and 112, and the line 117 is connected from the junction 118 between the resistors 115 and 116 to the + input of the comparator 110. The resistors 115 and 116 are of equal resistance and act as a voltage divider to divide the voltage $V_{b1}+V_{b2}$ that is present across the lines 111 and 112 in half to provide a voltage $V_c$. If the divided voltage $V_c$ is higher than the midpoint voltage at the node 40 between the two batteries, the top battery voltage level is higher than the lower battery voltage and hence the comparator input goes high, providing an enable signal on a line 120 to a pulse generator and gate drive circuit 121 which provides an output gating drive signal on a line 122 at a selected frequency to the switch 71. This results in energy being transferred from the top battery to the bottom battery within the pair. A level of hysteresis is provided in the comparator 110 to provide an error band within which the module is disabled and the two batteries are considered to be virtually equalized. The power for the control circuit is derived from the batteries and thus each of the modules 70 along with its control is entirely a stand-alone module which does not require a separate power supply.

Figure 14:
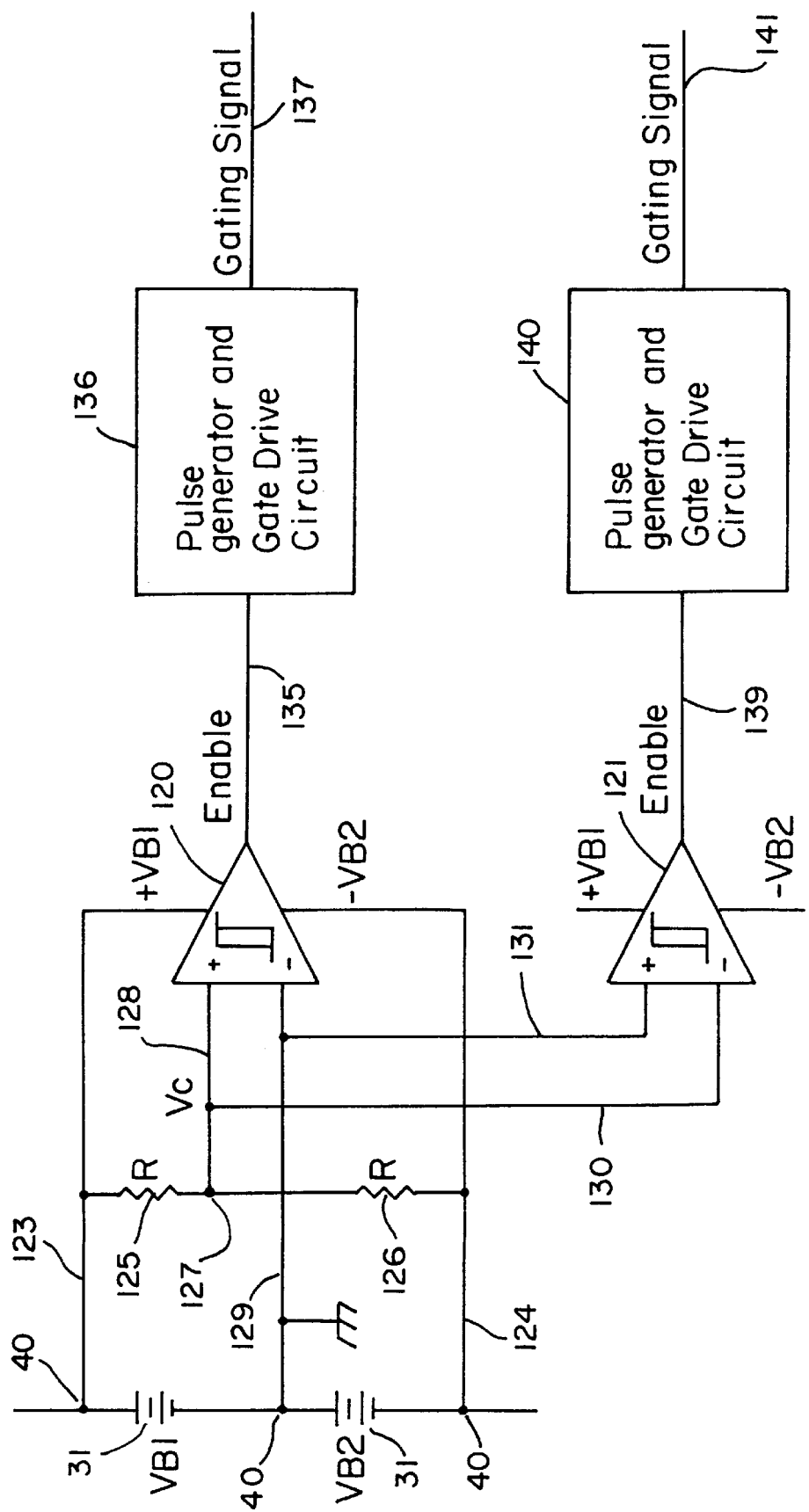
FIG. 14 is a schematic diagram of a controller for a bi-directional charge equalizer module in accordance with the invention.

A similar controller may be utilized for the bi-directional modules 90 as illustrated in FIG. 14. A comparison circuit has two comparators 120 and 121. A line 123 is connected to the high side of the first battery in the pair and a line 124 is connected to the low side of the second battery in the pair. The voltages on the lines 123 and 124 are provided to the comparators 120 and 121 to provide a power supply for the comparators. A pair of matched resistors 125 and 126 of equal resistance R are connected in series across the lines 123 and 124. The junction 127 between the resistors 125 and 126 is connected by a line 128 to the + input of the comparator 120 while the node 40 between the two batteries 31 is connected by a line 129 to the – input of the comparator 120. The voltage $V_c$ at the junction 127 between the resistors 125 and 126 is connected by a line 130 to the – input of the comparator 121, and the voltage at the junction 40 between the two batteries 31 is connected by a line 131 to the + input of the comparator 121. The output of the comparator 120 on a line 135 is connected to a pulse generator and gate drive circuit 136 which provides an output signal on a line 137 to the first switch 91, and the comparator 121 provides an output on a line 139 to a pulse generator and gate drive circuit 140 which provides its output on a line 141 to the second switch 92. Both of the comparators 120 and 121 preferably include hysteresis for the same purposes as that in the comparator 110. If the voltage $V_c$ is higher than the mid-point of the two batteries, the top comparator 120 will go high and the switch 91 is turned on in pulses at the selected frequency, thus transferring energy from the top battery to the bottom battery within the pair. On the other hand, if the voltage $V_c$ is lower than the voltage at the midpoint node 40 between the two batteries, the second comparator 121 will go high, thus activating the switching of the second switch 92. This will transfer energy from the bottom battery to the top battery within the pair.

It is understood that the pulse generator and gate drive circuits provides a gating output signal at a selected pulse frequency and duty cycle to turn on the switches 71 or 91 and 92 at selected times and frequencies to provide the equalization cycles. Preferably, the switching frequency is at least 20 kHz (above the audible range).

Figure 15:
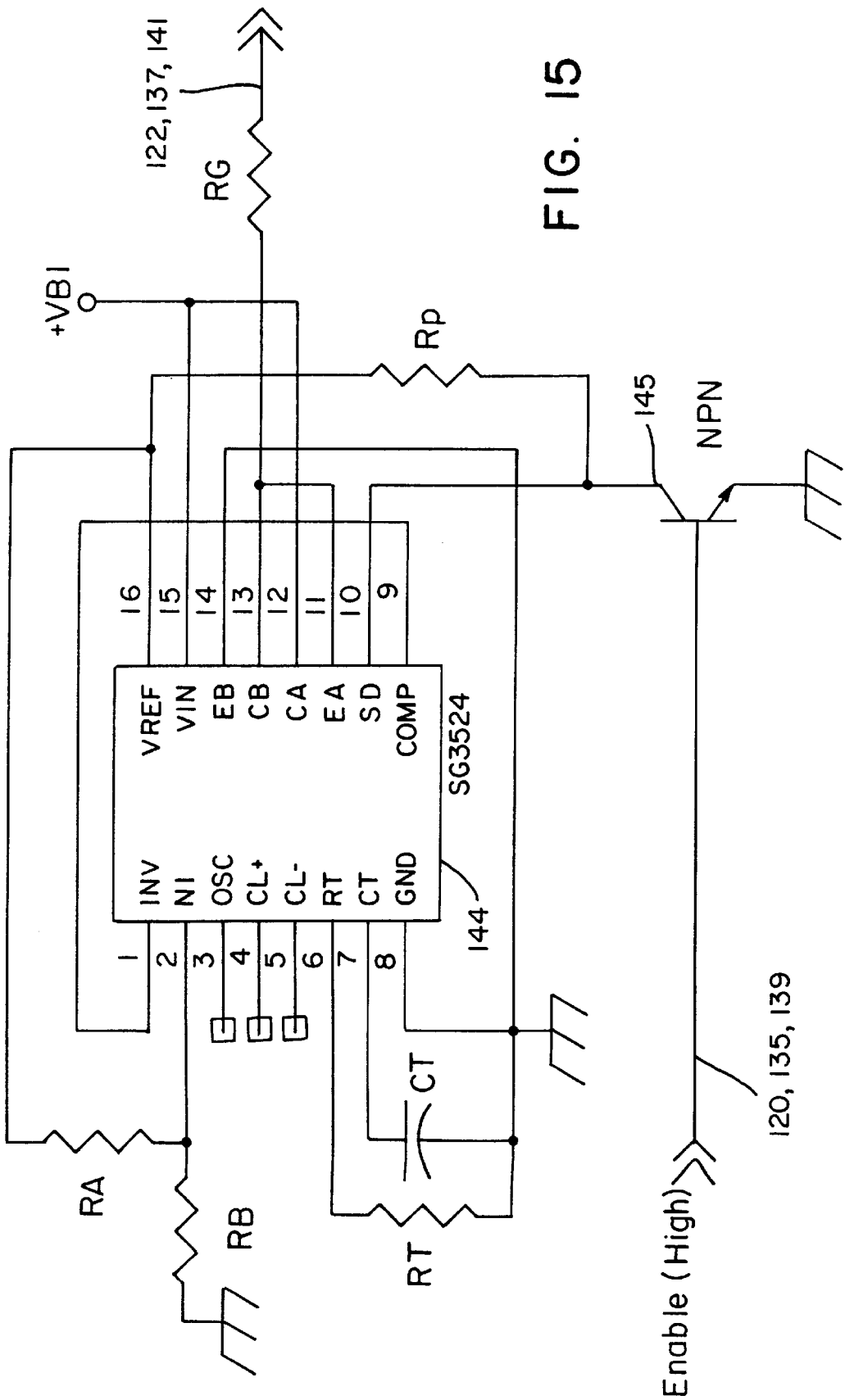
FIG. 15 is a schematic circuit diagram of a pulse generator and gate drive circuit that may be used in the circuits of FIGS. 13 and 14.

A suitable pulse generator and gate drive circuit for use as the circuits 121 of FIG. 13 and 136 and 140 of FIG. 14 can be realized using a commercial PWM IC such as the SG3524 from S. G. Thomson or the UC3524 manufactured by Unitrode and is shown in FIG. 15. The PWM IC 144 is a 16 pin chip and incorporates pulse generation and gate drive circuitry which is capable of driving switching power devices such as MOSFETs. The switching frequency is set by the components RT and CT. The maximum pulse width is set by RA and RB. The output drive circuitry, CA, EA, CB and EB, is connected in a push pull fashion and can be connected directly to the gate of the switching device through a series gate resistor, RG. The shutdown pin (SD) can be used to enable/disable the equalizer with the addition of an NPN signal transistor 145. When the enable signal is low, the NPN transistor 145 will be off causing the SD pin to be high. This causes the IC to be off, thus disabling the equalizer. When the enable signal is high, the NPN transistor 145 will be on, thus pulling the SD pin low. This will enable the equalizer.

In accordance with the invention, it is also possible to control fly-back based charge equalizers so that they exhibit the same favorable characteristics of the forward-based equalizers described above, namely, an equalization current level which is a function of the difference between the battery voltages in a pair of batteries. As discussed above, one of the main deficiencies of fly-back based equalizers such as that shown in FIG. 3 is that the equalization current is independent of the difference between the battery voltages. This also can result in hiccup operation caused by the appreciable voltage drop across the internal resistance of the battery due to the high charging current near the end of the equalization mode.

Figure 16:
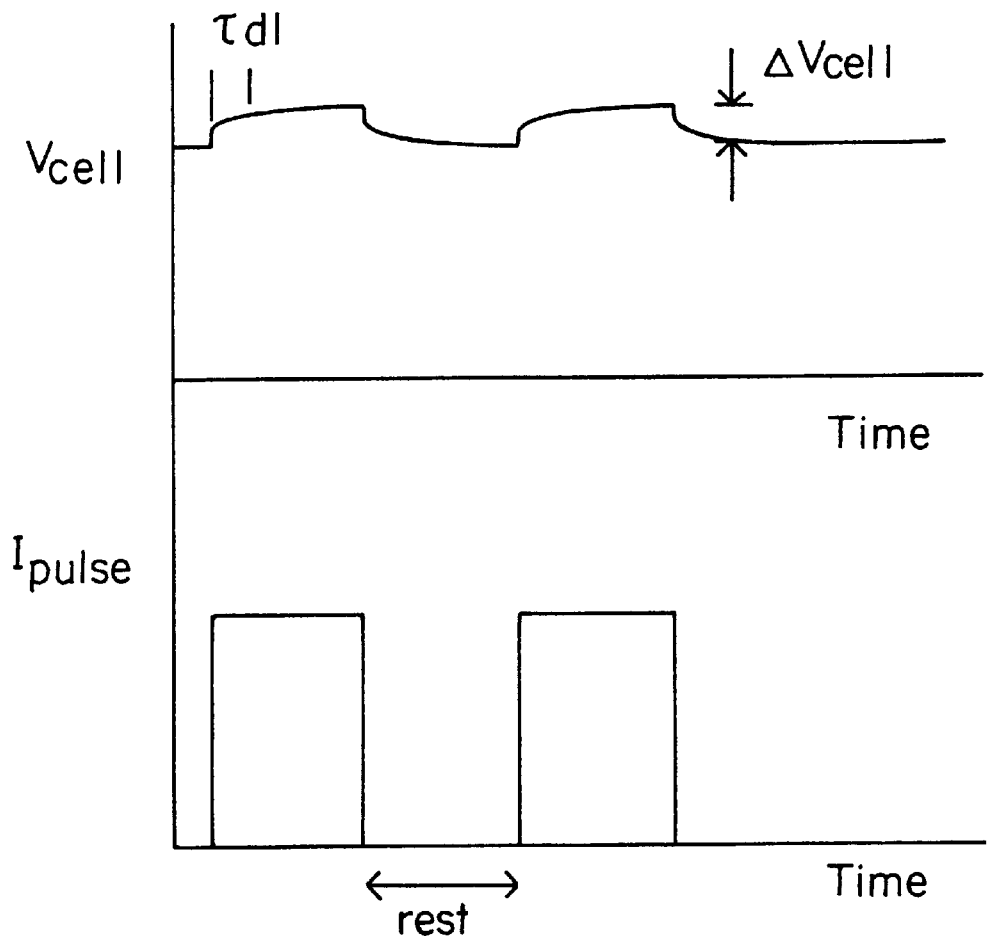
FIG. 16 are illustrative battery voltage and current waveforms during pulse equalization.
Figure 17:
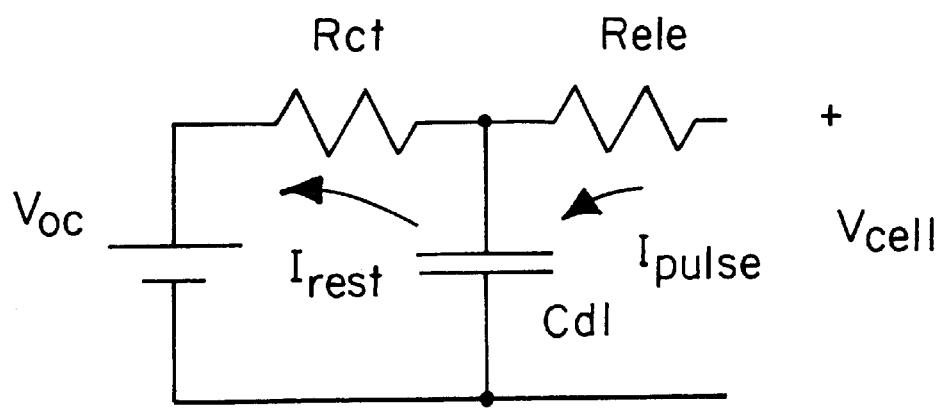
FIG. 17 is an equivalent circuit of a battery under pulse equalization.

The fly-back approach lends itself to a pulse-charging scheme, where the equalization charge is delivered in current pulses due to the hiccup mode of operation. Pulse mode charge equalization tends to cause large parasitic losses internal to those electrochemical cells exhibiting large double layer capacitances (e.g., lead-acid, nickel-metal hydride, nickel-cadmium). This capacitance effect can often be on the order of several hundred Farads for a typical valve regulated lead acid battery with a 20 Amp-hour capacity. The pulse charging of the double layer capacitance through the electrolyte resistance is a lossy process as illustrated in FIG. 16, showing voltage and current waveforms during pulse equalization, and in FIG. 17, showing the equivalent circuit of the battery under pulse equalization. During the rest period between pulses of current, the double layer capacitance transfers its excess charge to the ideal electrochemical storage element $V_{oc}$. This transfer of charge is done through the charge transfer resistance, $R_{ct}$, and the process is also lossy. To achieve higher charge equalization efficiencies, one or all of the following are preferably carried out: (1) the period of the pulse charging method must be much longer than the double layer time constant, $\tau_{dl}$; (2) the pulse current magnitude must be kept small; and (3) the change in the cell voltage, $\Delta V$ cell, must be kept small relative to the open circuit voltage.

Figure 18:
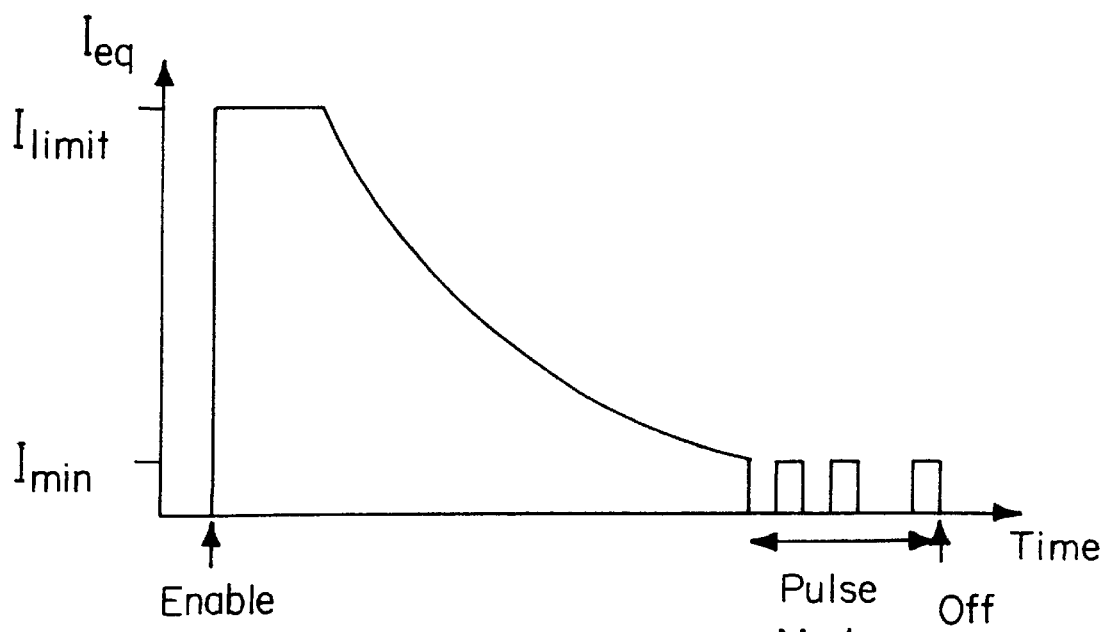
FIG. 18 is an illustrative waveform of charging current over time utilizing a preferred gradual taper mode of equalization with the charge equalizer modules in accordance with the present invention.

In accordance with the invention, to minimize the inefficiencies of pulse mode charging, a gradual current taper equalization method is preferably utilized. A gradual taper of the equalization current from a maximum value to a lower value as shown in FIG. 18 avoids the inefficiencies of the double layer capacitance effect. FIG. 18 illustrates an example of the gradual current taper method under the assumption that the method is enabled with the presence of a large voltage difference between the pair of batteries. As the difference in cell voltages is reduced, the equalization current is reduced as well.

Figure 19:
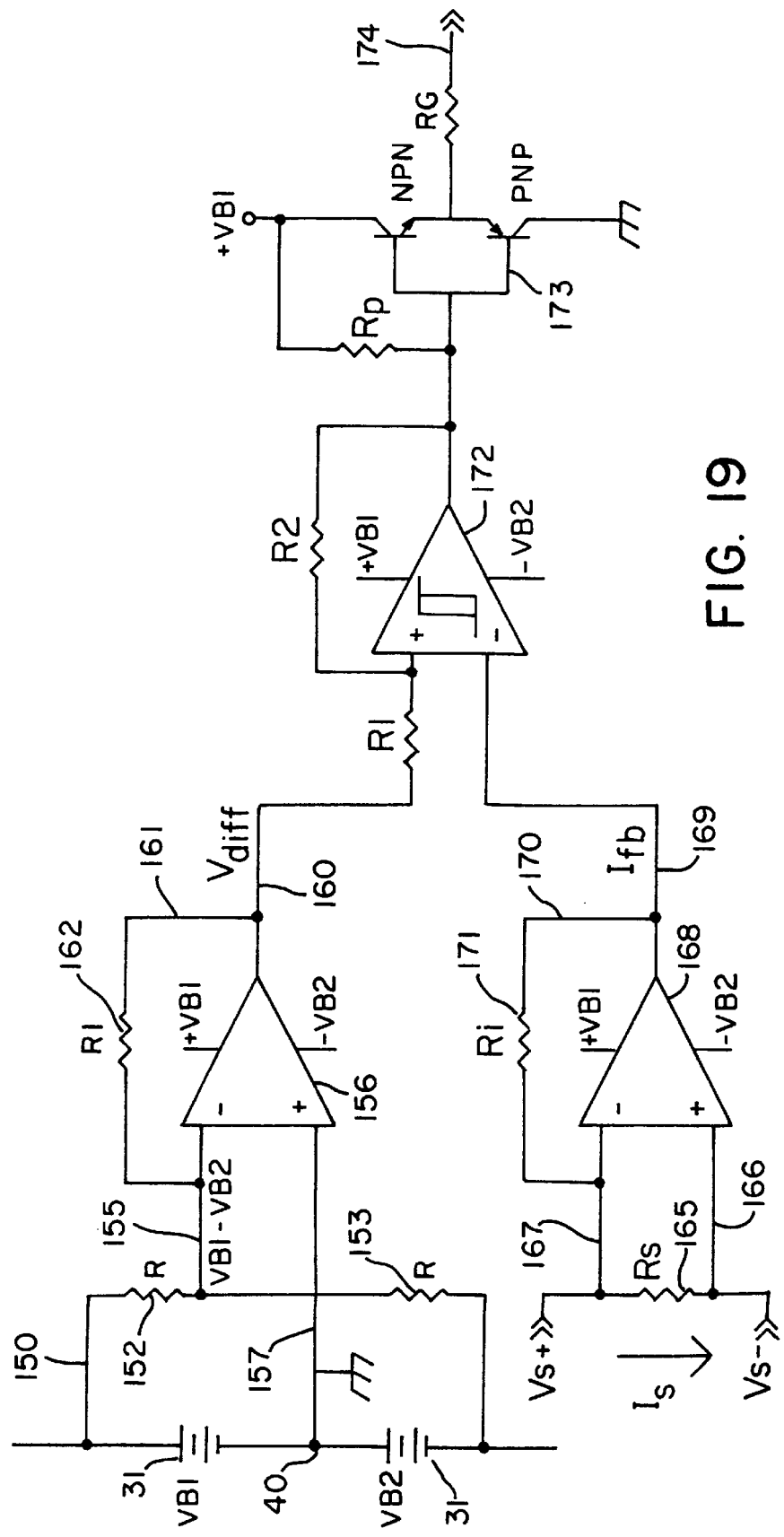
FIG. 19 is a schematic diagram of a controller with a hysteresis current regulator for a charge equalizer module in accordance with the invention.

A hysteresis-type controller that may be utilized to control fly-back converter modules of the type shown in FIGS. 3 and 4 to allow them to perform in a manner similar to forward-based equalizers, as well as to improve the performance of forward-based equalizers, is illustrated in FIG. 19. In this controller, the voltage at the high side of the first battery is provided on a line 150 and the voltage at the low side of the second battery is provided on a line 151. A voltage divider composed of matched resistors 152 and 153 of equal resistance R is connected in series across the lines 150 and 151. The voltage at the junction 154 between the resistors 151 and 152 is connected on the line 155 to the − input of a voltage differential amplifier 156, and the voltage at the node at the midpoint between the two batteries 31 is connected by a line 157 to the + input of the differential amplifier 156. The output of the amplifier 156 on a line 160 is fed back on a line 161 through a resistor 162 to the − input of the differential amplifier 156. The voltages on the lines 150 and 151 are also provided as power inputs to the amplifier 156. In the controller of FIG. 19, the converter current in the forward implementation, or the inductor current in the fly-back implementation, Is, is passed through a sensing resistor 165 of resistance $R_s$, and the voltage across the resistor 165 is provided on lines 166 and 167 to the − and + inputs of a current amplifier 168, which also receives power inputs from the lines 150 and 151. The output of the current amplifier 168 on a line 169 is fed back on a line 170 through a feedback resistor 171 to the − input of the amplifier 168.

Figure 20:
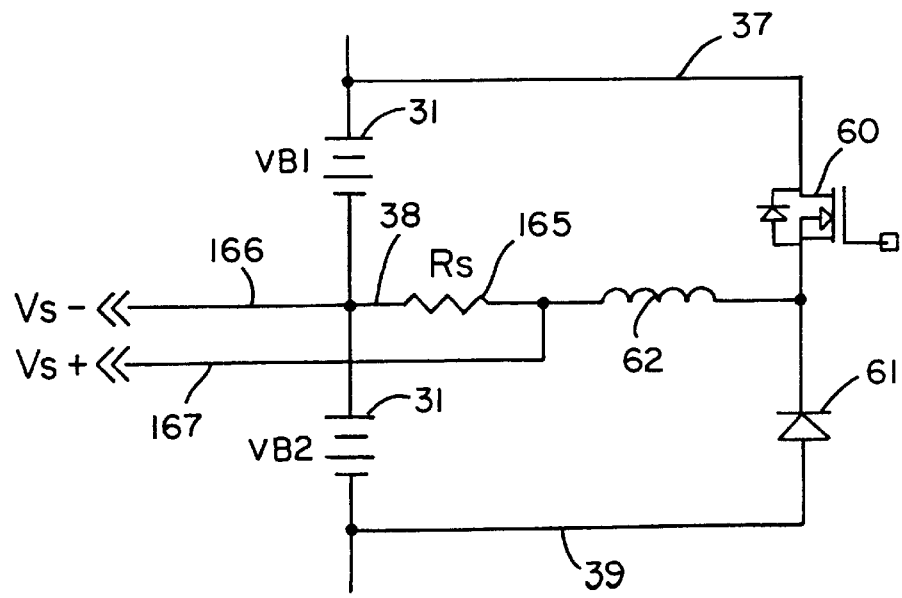
FIG. 20 is a schematic diagram of a current sensing circuit for the controller of FIG. 19 when used with a fly-back implementation of a charge equalizer such as that of FIG. 3.
Figure 21:
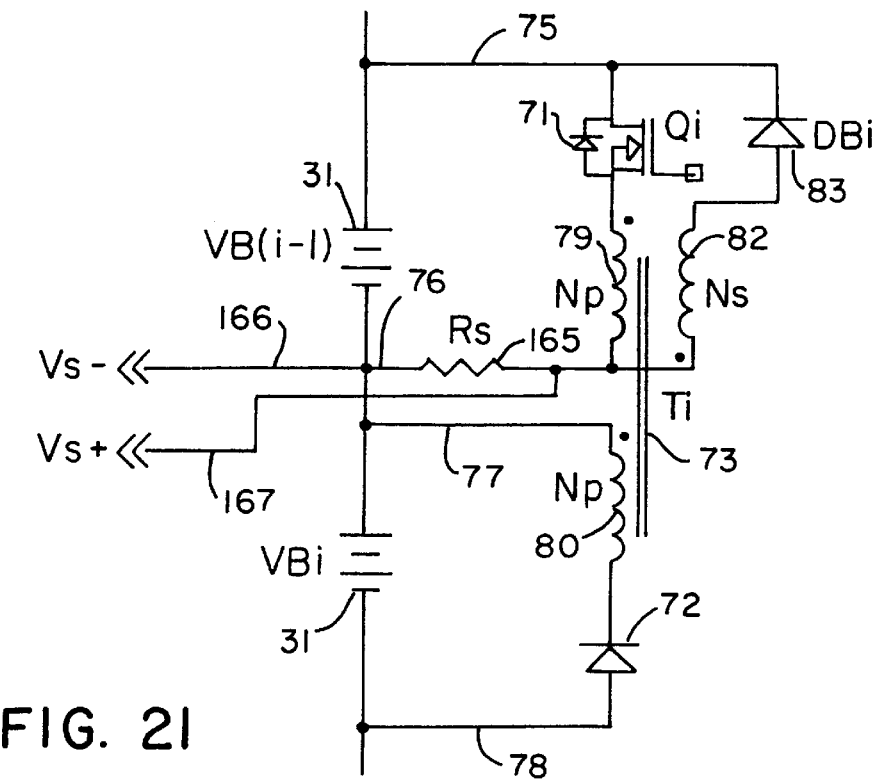
FIG. 21 is a schematic diagram of a current sensing circuit for the controller of FIG. 19 when used in a forward implementation of a charge equalizer such as that of FIGS. 7 and 9.

The current sense resistor, Rs, can be easily incorporated in both the fly-back based equalizer and a forward based equalizer. A typical implementation for a unidirectional fly-back based equalizer is shown in FIG. 20, while FIG. 21 shows a typical implementation for a unidirectional forward based equalizer.

The voltage on the line 160 at the output of the amplifier 156 is the difference between the voltage of the two batteries, $V_{diff}$, and the voltage at the line 169 at the output of the amplifier 168, $I_{fb}$, corresponds to the converter current or the inductor current. The lines 160 and 169 are connected to the + input and − input, respectively, of a hysteresis comparator 172 within a hysteresis current regulator, pulse generator and gate drive circuit 173. The circuit 172 may also receive the voltages on the lines 150 and 151 for power. The output signal from the comparator is provided to a push-pull driver 173, the output of which is provided on a line 174 to the appropriate switch for either the fly-back converter equalizer module or the forward converter equalizer module. The hysteresis type regulator 172 is used to regulate the converter (or inductor) current, wherein the voltage error signal, $V_{diff}$, is used to control $I_s$ by modulating the switch on and off times. A hysteresis band is used in the comparator 172 to limit the current ripple in the system.

Figure 22:
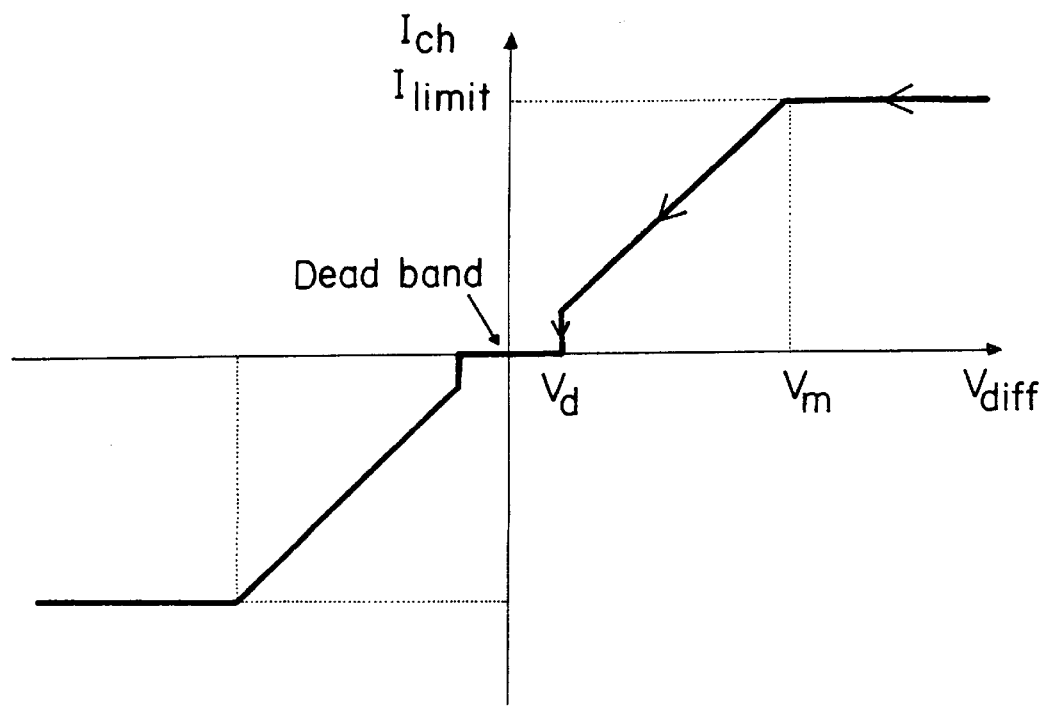
FIG. 22 is a V-I trajectory for the controller of FIG. 19.

The V-I trajectory utilizing the controller of FIG. 19 is shown in FIG. 22. A deadband is established where the equalizer is disabled if the voltage difference is below a selected threshold $V_d$. If the difference in battery voltages exceeds $V_d$, the equalizer module will be enabled. The current will be linearly proportional to the voltage difference unless the difference exceeds a maximum level $V_m$. If $V_m$ is exceeded, the equalizer module is run at full capacity until the difference is brought down to the linear range (i.e., between $V_d$ and $V_m$).

The arrows marked on the V-I trajectory show a typical equalization cycle wherein the voltage difference exceeds the maximum level set by $V_m$. In this typical cycle, the equalizer module will run at full power to bring down the voltage difference to the linear mode of the trajectory. During the linear mode, as the voltage difference decreases, the charging current will decrease as well. When the voltage difference drops below the threshold $V_d$, the charging current will then fall to zero.

Figure 23:
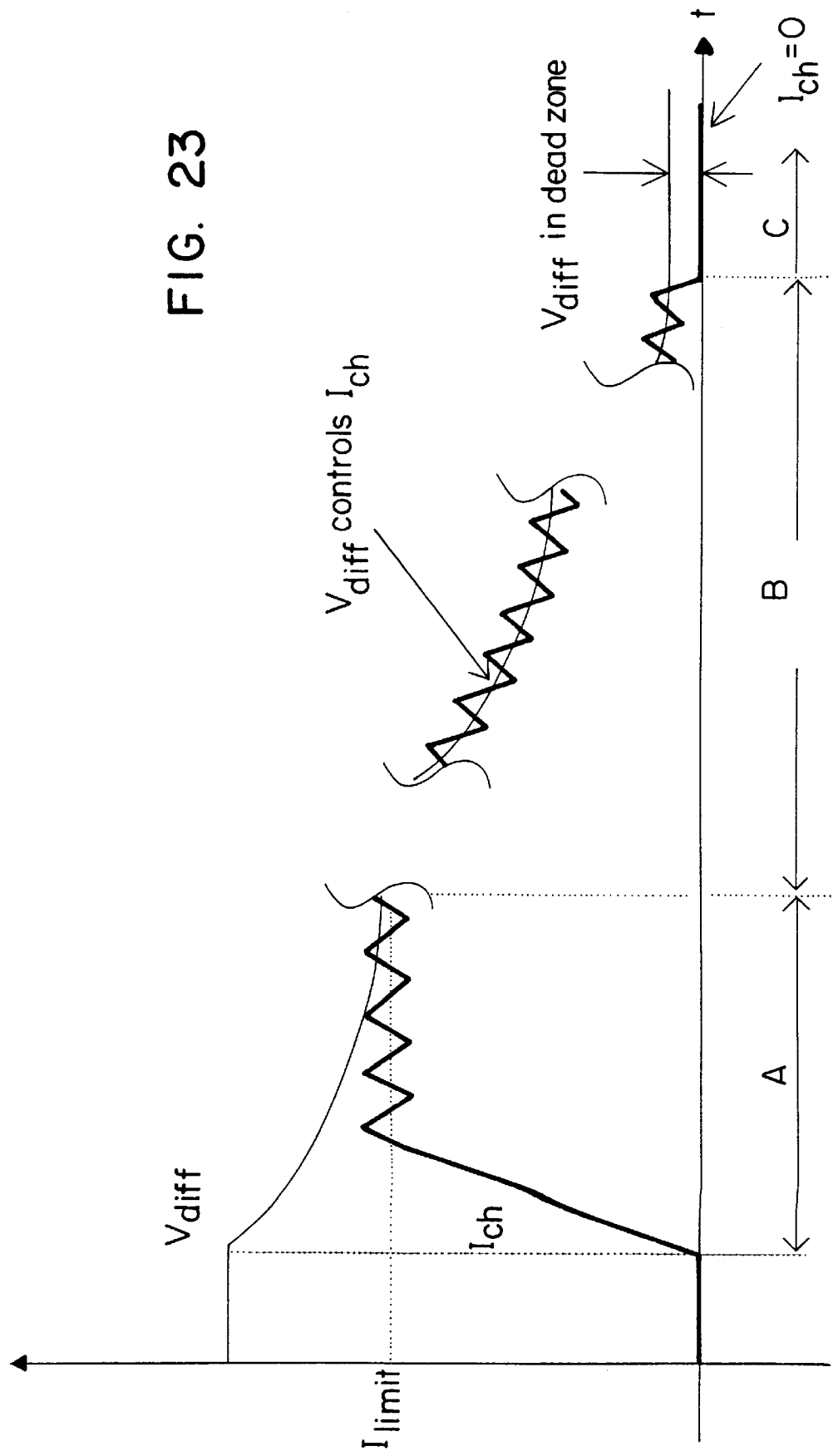
FIG. 23 is an illustrative waveform showing the current response due to battery voltage differences for the charge equalizer controller of FIG. 19.

FIG. 23 shows typical waveforms of an equalizer module with the controller of FIG. 19 which correspond to the trajectory shown in FIG. 22. As shown in FIG. 23, four distinct equalization modes can be identified as marked by A through D. During mode A, the voltage difference control level, $V_{diff}$, which is proportional to the voltage difference between the two series modules across which the equalizer is connected, is quite high causing the charge equalizer to run at full power. This is shown by the fact that the charging current, $I_{ch}$, is at its maximum limit, namely, $I_{limit}$. With time, the voltage difference between the two batteries is reduced due to the equalization action, thus reducing the $V_{diff}$ control level. When the voltage difference control level $V_{diff}$ becomes lower than $I_{limit}$, the charging current $I_{ch}$ will be directly controlled and modulated by $V_{diff}$ as shown during mode B. In fact, the average value of the charging current will be the same as $V_{diff}$. When $V_{diff}$ is reduced to a level that is lower than the threshold level set by $V_d$, the charge equalization is terminated as shown during mode C. It is seen from FIG. 23 that the level of the charging current is reduced as the voltage difference between the two batteries diminishes. This feature improves the efficiency of the charge equalization cycle and eliminates the inefficiencies associated with pulse charging, which are present in uncontrollable fly-back based equalizers. The gradual current taper equalization method assures that the charging current is gradually reduced from a maximum value to a lower value, thus avoiding the inefficiencies of the double layer capacitance effect that is present in lead-acid, nickel-metal hydride, and nickel-cadmium batteries.

Figure 24:
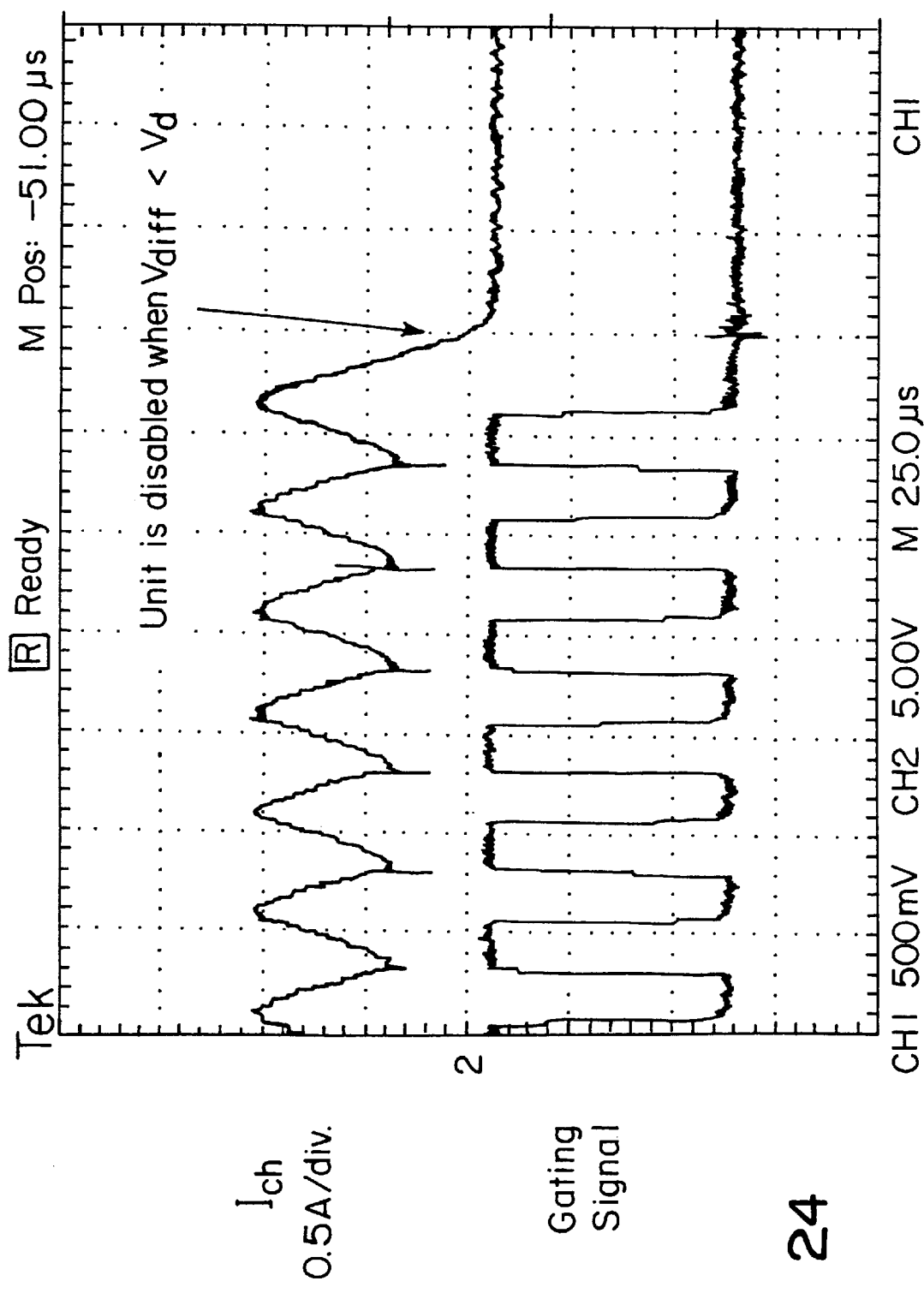
FIG. 24 are waveforms of the charging current and gating signals for a charge equalizer controller of the type shown in FIG. 19.

FIG. 24 shows the current waveform $I_{ch}$ and the switch gating signal waveform for the fly-back implementation of a module using the controller of FIG. 19. As seen from FIG.

24, the current exhibits the hysteresis control characteristics and that the average current value is decreasing as the voltage difference between the two batteries decreases. In addition, when the voltage difference, $V_{diff}$, is less than the deadband threshold $V_d$, the equalizer module is disabled, thus assuring proper equalization of the batteries.

It is understood that the invention is not limited to the embodiments set forth herein as illustrative, but embraces all such forms thereof as come within the scope of the following claims.

What is claimed is:

1. A battery equalizer module comprising:
   (a) a transformer having a primary and a secondary with the same number of turns;
   (b) a controllable switching device connected in series with the primary between a high side terminal and a first intermediate terminal of the module;
   (c) a diode connected in series with the secondary between a low side terminal and a second intermediate terminal of the module,
   whereby the module may be connected to a series connected pair of upper and lower batteries with the high side terminal connected to the high side of the upper battery, the first and second intermediate terminals connected to a junction between the two batteries and the low side terminal connected to the low side of the lower battery, and whereby a controller may be connected to the controllable switching device to control it to switch on and off at a frequency to transfer charge from a more highly charged upper battery in the pair of batteries to a lesser charged lower battery in the pair of batteries.

2. The equalizer module of claim 1 wherein the controlled switching device is a power MOSFET.

3. The equalizer module of claim 1 including a controller connected to the controllable switching device, wherein the controller includes a comparison circuit means having terminals connectable to the voltages across the high side and the low side of the two batteries and to a junction between the batteries for providing an output signal when the difference in battery voltages exceeds a selected value, the output signal provided on an output line to a pulse generator and gate drive circuit to provide a pulse gate drive signal at a selected frequency to the controllable switching device.

4. The equalizer module of claim 3 wherein the comparison circuit means includes a pair of resistors of equal resistance connected together in series between the high side terminal and the low side terminal of the module and a comparator having + and − inputs, the voltages on which are compared by the comparator, the + input of the comparator connected to a junction between the two resistors and the − input of the comparator connected to an intermediate terminal connectable to a junction between the pair of batteries.

5. The equalizer module of claim 4 wherein the comparator has deadband such that it provides an output signal when the voltage on the + input exceeds the voltage on the − input by a selected value and no output signal otherwise.

6. The equalizer module of claim 3 wherein the pulse generator and gate drive circuit when enabled by the output of the comparison circuit provides a pulse output to the controllable switching device at a switching frequency of at least 20 kHz.

7. The equalizer module of claim 1 further including an auxiliary reset winding on the transformer, the auxiliary reset winding connected in series with a diode between the first intermediate terminal and the high side terminal and coupled to the transformer with a polarity opposite to that of the primary.

8. A battery equalizer module comprising:
   (a) a transformer having a primary and a secondary with the same number of turns;
   (b) a first controllable switching device connected in series with the primary between an intermediate terminal and a high side terminal of the module;
   (c) a second controllable switching device connected in series with the secondary between a low side terminal and the intermediate terminal of the module;
   (d) a first free-wheeling diode connected to a junction between the secondary and the second controllable switching device and to the high side terminal to allow diversion of free-wheeling current around the transformer;
   (e) a second free-wheeling diode connected to the low side terminal and to a junction between the primary and the first controllable switching device to allow diversion of free-wheeling current around the transformer, whereby a controller may be connected to provide switching control signals to the first and second controllable switching devices to turn a selected one of them on and off at a frequency thereby to equalize the charge in a pair of batteries when connected thereto with the high side terminal connected to the high side of the pair, the low side terminal connected to the low side of the pair, and the intermediate terminal connected to a junction between the pair, by transferring charge from the more highly charged of the pair of batteries to the lesser charged of the pair of batteries.

9. The equalizer module of claim 8 wherein the controlled switching devices are power MOSFETs.

10. The equalizer module of claim 8 including a controller connected to the switching devices that includes a comparison circuit means having terminals connectable to the voltages across the high side and the low side of the two batteries and to a junction between the batteries for providing a first output signal when the voltage of the upper battery in the pair exceeds the voltage of the lower battery by more than a selected value, the first output signal provided to a first pulse generator and gate drive circuit connected to provide a pulse gate drive signal at a frequency to the first controllable switching device, and for providing a second output signal on a second output line when the voltage of the lower battery exceeds the voltage of the upper battery by a selected value, the second output signal provided to a second pulse generator and gate drive circuit connected to provide a pulse gate drive signal at a frequency to the second controllable switching device.

11. The equalizer module of claim 10 wherein the comparison means circuit includes a pair of resistors of equal resistance connected together in series between the high side terminal and the low side terminal of the module and two comparators having + and − inputs, the voltages on which are compared by the comparators, the + input of a first of the comparators connected to a junction between the two resistors and the − input of the first comparator connected to an intermediate terminal connectable to a junction between the pair of batteries, and the + input of the second comparator connected to the intermediate terminal and the − output of the second comparator connected to the junction between the two resistors.

12. The equalizer module of claim 11 wherein the comparators have deadband such that each provides an output signal when the voltage on the + input exceeds the voltage on the − input by a selected value and no output signal otherwise.

13. The equalizer module of claim 10 wherein the pulse generator and gate drive circuits when enabled by the output of the comparison circuit provide a pulse output to the controllable switching devices at a switching frequency of at least 20 kHz.

14. A battery equalization system comprising:
(a) at least three batteries connected in a string in series at junctions between the low sides and high sides of adjacent batteries;
(b) an equalizer module for each adjacent pair of batteries that are connected together at a junction, each equalizer module comprising:
(i) a transformer having a primary and a secondary with the same number of turns;
(ii) a controllable switching device connected in series with the primary between a high side terminal of the module and a first intermediate terminal;
(iii) a diode connected in series with the secondary between a low side terminal and second intermediate terminal of the module,
each module except the lowest connected to a pair of upper and lower batteries with the high side terminal of the module connected to the high side of the upper battery, the first and second intermediate terminals connected to the junction between the two batteries, and the low side terminal connected to the low side of the lower battery, wherein the last module connected to the last battery in the series connected string of batteries has its high side terminal connected to the high side of the last battery and its first intermediate terminal connected to the low side of the last battery, and has its second intermediate terminal connected to the high side of the first battery in the string of batteries and has its low side terminal connected to the low side of the first battery in the string of batteries, and the modules connected to the batteries in staggered relation such that the intermediate terminals of an upper module are connected to a junction between a pair of batteries to which the next lower module is connected by its high side terminal, whereby a controller may be connected to the controllable switching device in each module to control it to switch on and off at a frequency to transfer charge from a more highly charged upper battery in the pair of batteries to a lesser charged lower battery in the pair of batteries.

15. The battery equalization system of claim 14 wherein the controlled switching device is a power MOSFET.

16. The battery equalization system of claim 14 wherein each module has a controller that includes a comparison circuit means having terminals connectable to the voltages across the high side and the low side of two batteries and to a junction between the batteries for providing an output signal when the difference in battery voltages exceeds a selected value on an output line to a pulse generator and gate drive circuit to provide a pulse gate drive signal at a selected frequency to the controllable switching device of the module.

17. The battery equalization system of claim 16 wherein the comparison circuit means includes a pair of resistors of equal resistance connected together in series between the high side terminal and the low side terminal of the module and a comparator having + and − inputs, the voltages on which are compared by the comparator, the + input of the comparator connected to a junction between the two resistors and the − input of the comparator connected to an intermediate terminal connectable to a junction between the pair of batteries.

18. The battery equalization system of claim 17 wherein the comparator has deadband such that it provides an output signal when the voltage on the + input exceeds the voltage on the − input by a selected value and no output signal otherwise.

19. The battery equalization system of claim 16 wherein the pulse generator and gate drive circuit when enabled by the output of the comparison circuit means provides a pulse output to the controllable switching device at a switching frequency of at least 20 kHz.

20. The battery equalization system of claim 14 further including an auxiliary reset winding on the transformer, the auxiliary reset winding connected in series with a diode between the first intermediate terminal and the high side terminal and coupled to the transformer with a polarity opposite to that of the primary.

21. The battery equalization system of claim 14 further including a charger connected to the string of batteries to supply charging current to the series connected string of batteries.

22. A battery equalization system comprising:
(a) a plurality of batteries connected in a string in series at junctions between the low side and high side of adjacent batteries;
(b) a plurality of battery equalizer modules each having a high side terminal, an intermediate terminal and a low side terminal, the modules connected in staggered relation to the series connected batteries such that each module is connected to a pair of batteries with its high side terminal connected to the high side of the first battery in the pair, its intermediate terminal connected to the junction between the batteries and its low side terminal connected to the low side of the second battery in the pair, the modules connected to the pairs of batteries in staggered relation such that the second and lower modules are connected such that the high side terminal of the module is connected to a junction between a pair of batteries to which the intermediate terminal of the higher module is connected and its intermediate terminal is connected to the junction between a pair of batteries to which the low side terminal of the adjacent upper module is connected, each of the equalizer modules comprising:
(i) a transformer having a primary and a secondary with the same number of turns;
(ii) a first controllable switching device connected in series with the primary between an intermediate terminal and a high side terminal of the module;
(iii) a second controllable switching device connected in series with the secondary between a low side terminal and the intermediate terminal of the module;
(iv) a first free-wheeling diode connected to a junction between the secondary and the second controllable switching device and to the high side terminal to allow diversion of free-wheeling current around the transformer;
(v) a second free-wheeling diode connected to the low side terminal and to a junction between the primary and the first controllable switching device to allow diversion of free-wheeling current around the transformer, whereby a controller may be connected to each module to provide switching control signals to the first and second controllable switching devices in each module to turn a selected one of them on and off at a frequency thereby to equalize the charge in a pair of batteries when connected to the high side terminal at the high side of the pair, to the low side terminal at the low side of the pair, and to the intermediate terminal between the pair, by transferring charge from the more highly charged of the pair of batteries to the lesser charged of the pair of batteries.

23. The battery equalizer system of claim 22 wherein the controlled switching devices are power MOSFETs.

24. The battery equalizer system of claim 22 wherein each module has a controller that includes a comparison circuit means having terminals connectable to the voltages across the high side and the low side of the two batteries and to a junction between the batteries for providing a first output signal when the voltage of the upper battery in the pair exceeds the voltage of the lower battery by more than a selected value, the first output signal provided to a first pulse generator and gate drive circuit connected to provide a pulse gate drive signal at a selected frequency to the first controllable switching device, and for providing a second output signal on a second output line when the voltage of the lower battery exceeds the voltage of the upper battery by a selected value, the second output signal provided to a second pulse generator and gate drive circuit connected to provide a pulse gate drive signal at a selected frequency to the second controllable switching device.

25. The battery equalizer system of claim 24 wherein the comparison circuit means includes a pair of resistors of equal resistance connected together in series between the high side terminal and the low side terminal of the module and two comparators having + and − inputs, the voltages on which are compared by the comparators, the + input of a first of the comparators connected to a junction between the two resistors and the − input of the first comparator connected to an intermediate terminal connectable to a junction between the pair of batteries, and the + input of the second comparator connected to the intermediate terminal and the − output of the second comparator connected to the junction between the two resistors.

26. The battery equalizer system of claim 25 wherein the comparators have deadband such that each provides an output signal when the voltage on the + input exceeds the voltage on the − input by a selected value and no output signal otherwise.

27. The battery equalizer system of claim 22 wherein the pulse generator and gate drive circuits when enabled by the output of the comparison circuit means provide a pulse output to the controllable switching devices at a switching frequency of at least 20 kHz.

28. The battery equalizer system of claim 22 further including a charger connected to the string of batteries to provide charging current thereto.

29. A method of equalizing the charge on a string of batteries connected in series comprising:
(a) connecting an equalizer module across a pair of series connected batteries to be equalized, the equalizer module including a transformer having a primary and a secondary with the same number of turns, a controllable switching device connected in series with the primary between a high side terminal of the module that is connected to the high side of the first battery in the pair and a first intermediate terminal which is connected to the low side of the first battery in the pair, a diode connected in series with the secondary between a low side terminal and a second intermediate terminal of the module, the low side terminal connected to the low side of the second battery in the pair and the second intermediate terminal connected to the high side of the second battery in the pair;

(b) when the upper battery in the pair is charged to a voltage level higher than the voltage of the lower battery in the pair by a selected value, turning the controllable switching device on and off periodically at a frequency such that when the switching device is turned on current flows through the primary of the transformer from the first battery in the pair and is coupled to the secondary to cause current flow in the secondary to the second battery, thereby transferring charge from the upper battery to the lower battery.

30. The method of claim 29 further including connecting a module to the lowest battery in the string of batteries with the high side terminal of the module connected to the high side of the lowest battery and the first intermediate terminal of the module connected to the low side of the lowest battery, and with the second intermediate terminal of the module connected to the high side of the first battery in the string of batteries and the low side terminal of the last module connected to the low side of the first battery in the string of batteries, and when the last battery in the string of batteries has a voltage level that exceeds the voltage level of the first battery in the string of batteries by a selected value, turning the switching device in the last module on and off periodically at a frequency such that when it is turned on voltage flows through the switching device and the primary of the transformer from the last battery and is coupled to the secondary to cause current flow through the secondary, thereby to transfer charge from the last battery in the string to the first battery in the string.

31. The method of claim 29 including the step of providing charging current to the string of series connected batteries, and when the voltage on the first battery in the pair of batteries to which a module is connected has a higher voltage level than the second battery in the pair by a selected value, turning on the switching device in the module and leaving it on to cause the charging current to bypass the first battery and be diverted to the second battery in the pair.

32. A method of equalizing the charge on the batteries in a series connected string of batteries comprising:
(a) connecting an equalizer module across a pair of series connected batteries to be equalized, the equalizer module including a transformer having a primary and a secondary with the same number of turns, a first controllable switching device connected in series with the primary between an intermediate terminal and a high side terminal of the module, a second controllable switching device connected in series with the secondary between a low side terminal and the intermediate terminal of the module, a first free-wheeling diode connected to a junction between the secondary and the second controllable switching device and to the high side terminal to allow diversion of free-wheeling current around the transformer, and a second free-wheeling diode connected to the low side terminal at a junction between the primary and first controllable switching device to allow diversion of free-wheeling current around the transformer, the high side terminal connected to the high side of the first battery in the pair, the intermediate terminal connected to a junction between the two batteries in the pair, and the low side terminal connected to the low side of the second battery in the pair; and (b) when the voltage on one of the batteries in the pair exceeds the voltage on the other battery by a selected value, turning on and off the one of the first and second switching devices which is connected around the battery with the higher voltage level in a periodic manner at a frequency such that when the switching device is turned on current flows from the more highly charged battery through the switching device and the winding of the transformer to which the switching device is connected and is coupled to the other winding to cause current flow therethrough to the lesser charged battery, thereby to transfer charge to the lower voltage battery.

33. The method of claim 32 further including supplying charging current from a charger to the series connected string of batteries, and when one of the batteries in the pair of batteries to which a module is connected has a voltage level that exceeds the voltage level of the other battery in the pair by a selected value, turning on the switching device in the module connected across the battery with the higher voltage level to bypass the charging current from that battery to the battery in the pair having the lower voltage.

34. A controller for controlling the switching of switching devices in a battery charge equalizer module connected to a pair of series connected batteries, comprising:

(a) a voltage comparison circuit means having terminals connected to the voltages across the high side and the low side of the two batteries and to a junction between the batteries for providing an output signal proportional to the difference in the voltages between the batteries;

(b) a current differential amplifier connectable in a line leading to the battery being equalized by the module to monitor the current in the line and providing an output signal proportional to the current;

(c) a hysteresis comparator receiving the signals proportional to the voltage difference and to the current and comparing the signals and providing an output signal to a pulse generator and gate drive circuit to switch a switching device in the charge equalizer module at a frequency when the difference exceeds a selected value, the comparator having hysteresis, wherein the level of the charging current is reduced as the voltage difference between the two batteries becomes lower.

35. The controller of claim 34 wherein the voltage comparison circuit means includes a pair of resistors of equal resistance connected together in series between the high side terminal and the low side terminal across the two batteries and a voltage differential amplifier receiving as one input the voltage at the junction between the series connected and as the other input the voltage at the junction between the two resistors and providing an output signal proportional to the difference between the input voltages.

36. The controller of claim 34 wherein the current differential amplifier includes a resistor connected in the line through which the charging current passes, the differential amplifier receiving as its inputs the voltages at the two sides of the resistor and providing an output signal proportional to the value of the voltage across the resistor.

* * * * *